US010273874B2

(12) United States Patent
Santillo et al.

(10) Patent No.: US 10,273,874 B2
(45) Date of Patent: Apr. 30, 2019

(54) METHOD AND SYSTEM FOR COMPRESSOR OUTLET TEMPERATURE REGULATION

(71) Applicant: Ford Global Technologies, LLC, Dearborn, MI (US)

(72) Inventors: Mario Anthony Santillo, Canton, MI (US); John Erik Mikael Hellstrom, Ann Arbor, MI (US); Hamid-Reza Ossareh, Livonia, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 15/130,500

(22) Filed: Apr. 15, 2016

(65) Prior Publication Data
US 2017/0298811 A1  Oct. 19, 2017

(51) Int. Cl.
*F02B 37/12*   (2006.01)
*F02D 41/00*   (2006.01)
*F02D 41/24*   (2006.01)
*F02D 41/26*   (2006.01)
*F02D 9/02*    (2006.01)
*G01C 21/26*   (2006.01)
*F02D 41/14*   (2006.01)
(Continued)

(52) U.S. Cl.
CPC ............. *F02B 37/12* (2013.01); *F02D 9/02* (2013.01); *F02D 23/00* (2013.01); *F02D 41/0002* (2013.01); *F02D 41/0007* (2013.01); *F02D 41/1401* (2013.01); *F02D 41/2406* (2013.01); *F02D 41/26* (2013.01); *G01C 21/26* (2013.01); *F02D 41/1448* (2013.01); *F02D 41/18* (2013.01); *F02D 2009/0225* (2013.01); *F02D 2009/0227* (2013.01); *F02D 2009/0276* (2013.01); *F02D 2041/0017* (2013.01); *F02D 2041/1412* (2013.01); *F02D 2200/701* (2013.01); *F02D 2200/703* (2013.01); *Y02T 10/144* (2013.01); *Y02T 10/42* (2013.01)

(58) Field of Classification Search
CPC ............. F02B 37/12; F02B 2037/122; F02D 2041/141; F02D 2041/1433; F02D 2200/0402; F02D 2200/60–2200/606; F02D 2200/70–2200/704; F02D 2250/18; F02D 2250/26; F02D 23/00; F02D 41/0002; F02D 41/0007; B60W 2550/14–2550/148; B60W 2550/40–2550/408
See application file for complete search history.

(56) References Cited

U.S. PATENT DOCUMENTS 5,054,294 A   10/1991 Dudley
5,719,771 A   2/1998 Buck et al.
(Continued)

*Primary Examiner* — Mahmoud Gimie
*Assistant Examiner* — John Zaleskas
(74) *Attorney, Agent, or Firm* — Julia Voutyras; McCoy Russell LLP

(57) ABSTRACT

Methods and systems are provided for controlling a boosted engine system, having a turbocharger and a charge air cooler, to limit overheating of a compressor outlet. In one example, a method includes predicting an engine torque profile based on current and future engine operating conditions. The method then models a compressor outlet temperature profile and reduces engine torque output to limit overheating of the compressor outlet.

8 Claims, 8 Drawing Sheets

(51) Int. Cl.
*F02D 23/00* (2006.01)
*F02D 41/18* (2006.01)

(56) References Cited

U.S. PATENT DOCUMENTS

| | | | | |
|---|---|---|---|---|
| 5,850,738 | A * | 12/1998 | Hayashi | F02B 37/18 60/602 |
| 5,927,248 | A | 7/1999 | Lang et al. | |
| 6,006,540 | A | 12/1999 | Coletti | |
| 6,055,812 | A * | 5/2000 | Trumbower | F02B 37/007 60/612 |
| 6,076,500 | A | 6/2000 | Clement et al. | |
| 6,151,549 | A * | 11/2000 | Andrews | F02D 41/0007 180/167 |
| 6,672,060 | B1 | 1/2004 | Buckland et al. | |
| 6,725,659 | B1 * | 4/2004 | Shao | F02D 41/0007 60/601 |
| 6,837,225 | B1 * | 1/2005 | Fukuda | B64D 31/06 123/552 |
| 7,235,034 | B2 | 6/2007 | Berglund et al. | |
| 7,274,986 | B1 | 9/2007 | Petridis et al. | |
| 7,275,426 | B2 | 10/2007 | Lahti et al. | |
| 7,305,825 | B2 | 12/2007 | Ruiz et al. | |
| 7,347,168 | B2 | 3/2008 | Reckels et al. | |
| 8,700,256 | B2 * | 4/2014 | Duraiswamy | B60W 30/143 340/439 |
| 8,744,716 | B2 | 6/2014 | Kar et al. | |
| 2003/0216856 | A1 * | 11/2003 | Jacobson | F02B 37/00 701/114 |
| 2004/0068359 | A1 * | 4/2004 | Neiss | B60K 31/0058 701/96 |
| 2004/0216457 | A1 * | 11/2004 | Shea | F02B 37/12 60/608 |
| 2007/0112475 | A1 * | 5/2007 | Koebler | B60L 3/12 701/1 |
| 2007/0255483 | A1 * | 11/2007 | Tanaka | F02D 35/0023 701/101 |
| 2007/0261648 | A1 * | 11/2007 | Reckels | F01P 7/167 123/41.12 |
| 2008/0148827 | A1 * | 6/2008 | Keski-Hynnila | G01M 15/05 73/114.31 |
| 2008/0271452 | A1 * | 11/2008 | Reynolds | F02D 41/0007 60/611 |
| 2008/0276614 | A1 * | 11/2008 | Shu | F02B 39/16 60/602 |
| 2009/0090107 | A1 * | 4/2009 | Youssef | F02D 41/0007 60/602 |
| 2009/0198432 | A1 * | 8/2009 | Tabata | F02D 23/02 701/103 |
| 2009/0293476 | A1 * | 12/2009 | Evans | F02D 23/00 60/602 |
| 2010/0010732 | A1 | 1/2010 | Hartman | |
| 2010/0236531 | A1 * | 9/2010 | Shimizu | F02B 39/16 123/564 |
| 2010/0263638 | A1 * | 10/2010 | Kogo | F02B 37/004 123/562 |
| 2011/0041493 | A1 * | 2/2011 | Doering | F02D 41/0007 60/603 |
| 2011/0106388 | A1 * | 5/2011 | Boeckenhoff | B60W 10/06 701/70 |
| 2011/0289915 | A1 * | 12/2011 | Gentile | F02B 37/22 60/605.1 |
| 2014/0257669 | A1 * | 9/2014 | Wu | B60W 10/06 701/102 |
| 2015/0143882 | A1 * | 5/2015 | Nakano | F02B 39/16 73/112.05 |
| 2015/0275805 | A1 * | 10/2015 | Petrovic | G01F 1/86 701/102 |
| 2015/0316390 | A1 | 11/2015 | Kameyama | |
| 2015/0361915 | A1 * | 12/2015 | Sujan | F02D 9/02 701/54 |
| 2017/0002728 | A1 * | 1/2017 | Saeki | F02B 37/18 |

\* cited by examiner

METHOD AND SYSTEM FOR COMPRESSOR OUTLET TEMPERATURE REGULATION

FIELD

The present description relates generally to methods and systems for regulating engine operation based on future engine operating conditions.

BACKGROUND/SUMMARY

Engines may be operated using a turbocharger or supercharger to increase mass airflow into the combustion chamber. Turbochargers and superchargers compress intake air entering the engine using an intake compressor. Because this compression may cause an increase in air temperature, a charge air cooler is utilized downstream of the compressor outlet to reduce air temperature before combustion. However, the intake components upstream of the charge air cooler may still be subjected to the high temperature air. In particular, during conditions when engine load is high, and the engine is operating with boost, the boosted intake air can become hot enough to potentially degrade the intake conduit between the compressor outlet and the charge air cooler. Extreme compressor outlet temperatures can also result in compressor coking wherein the oxidation of oil droplets form abrasive deposits on compressor bearings, resulting in premature hardware degradation, and related warranty issues. Accordingly various approaches have been developed for controlling the compressor outlet temperature in a boosted engine system.

One example approach for compressor temperature control is shown by Clement et al. in U.S. Pat. No. 6,076,500. Therein, engine torque is limited based on a measured engine temperature and/or measured intake air temperature. In particular, the permissible engine torque is decreased if the measured intake air temperature exceeds a threshold value.

However, the inventors herein have recognized potential issues with such systems. As one example, it may be difficult to limit engine torque while balancing the conflicting needs to maintain engine performance and maintain engine component integrity. For example, during conditions when engine load is high, engine torque may be decreased to lower levels responsive to an elevated intake air temperature so as to protect the engine against overheating that can occur if the engine load remains high for an extended period of time. However, if the high load condition is transient, the actual heating incurred at the compressor outlet may be significantly lower than the heating expected based on the air temperature measurement.

Specifically, current measurements of the intake air temperature may not reflect the actual temperature of components in the intake due to the thermodynamics of the intake system (e.g., delay in heating or cooling of intake components relative to heating or cooling of intake air). Thus, the rate at which the intake air changes temperature may be higher than that of the intake components. For example, as a driver requested torque increases, and an amount of boost increases to meet the torque demands, the intake air temperature may increase more rapidly than the engine intake components, such as the compressor and the intake conduit tubing included between the compressor and the charge air cooler. As such, the intake components may be at a lower temperature than the intake air during the increase in torque demand, and may not reach thermal equilibrium with the intake air until after the intake air temperature has remained relatively constant for a duration. Thus, the intake components may not reach potentially degrading temperatures until after the engine has been operating at high load for a threshold duration. As a result, when a high engine load is requested for only a short duration, engine torque may be overly limited, degrading the boosted engine performance.

In one example, the issue described above may be at least partly addressed by a method for an engine comprising: adjusting an engine torque output based on a future compressor outlet temperature profile to maintain an actual compressor outlet temperature below a threshold, the future compressor outlet temperature profile based on current and predicted engine operating conditions estimated based on inputs from external vehicle. In this way, compressor outlet temperature may be more precisely regulated without unnecessarily restricting engine torque output.

As one example, during boosted engine operation, an engine controller may model a compressor outlet temperature (or temperature profile) based on current and predicted engine operating conditions including current and future torque requirements. Future torque requirements may be estimated based on vehicle-specific information such as driver behavior history, engine knocking history, etc., as well as information provided by external vehicle communication, such as navigation route, road-grade information, traffic information, etc. The information provided via external vehicle communication may be retrieved using a navigation system communicatively coupled to the controller, wireless communication, vehicle-to-vehicle communication, etc. The future torque requirement estimates are used in conjunction with current vehicle measurements to model the compressor outlet temperature over a future horizon (which includes an upcoming segment of vehicle travel). In particular, the engine torque is used to determine an engine mass-flow rate, which in turn is used with a barometric pressure estimate to determine an exhaust back-pressure estimate. The exhaust back-pressure is then used to infer a compressor pressure ratio, and therefrom an instantaneous compressor outlet temperature may be modeled. The modeled compressor outlet temperature may then be filtered to model an intake conduit temperature (including a temperature of the material in the intake conduit coupling the compressor outlet to the charge air cooler, as well as a temperature of the gases flowing in the conduit) over the future horizon. The controller may then limit an engine torque output based on the modeled compressor outlet temperature profile so as to maintain each of the compressor outlet temperature and the intake conduit temperature below respective thresholds. In another example, the engine torque output may be, additionally or optionally, adjusted to maintain a throttle inlet pressure. For example, the controller may limit the engine torque via adjustments to an intake throttle and/or an exhaust wastegate actuator.

In this way, engine torque output can be more accurately adjusted based on the future compressor outlet temperature profile. A technical effect of increasing torque output while maintaining the temperature of intake components below respective threshold temperatures is achieved by predicting temperatures of one or more intake components based on predicted engine operating conditions. In addition, the engine torque limiting can be more precisely controlled to be aggressive enough to deliver the demanded torque while reducing intake conduit degradation. In this way, overheating of engine components is reduced and engine torque output is not excessively limited.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
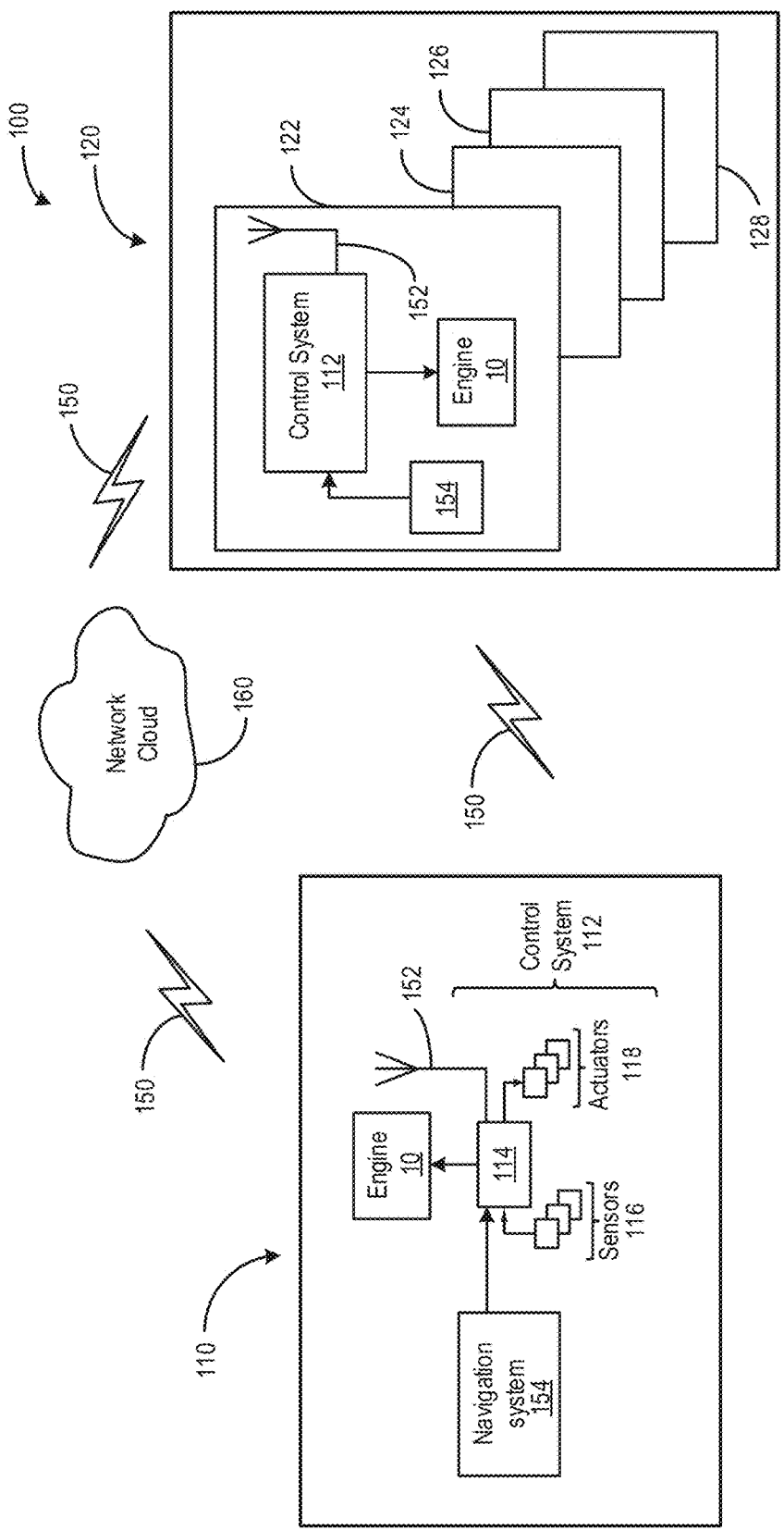
FIG. 1 shows an example of a vehicle system coupled to an external communication system.
Figure 2:
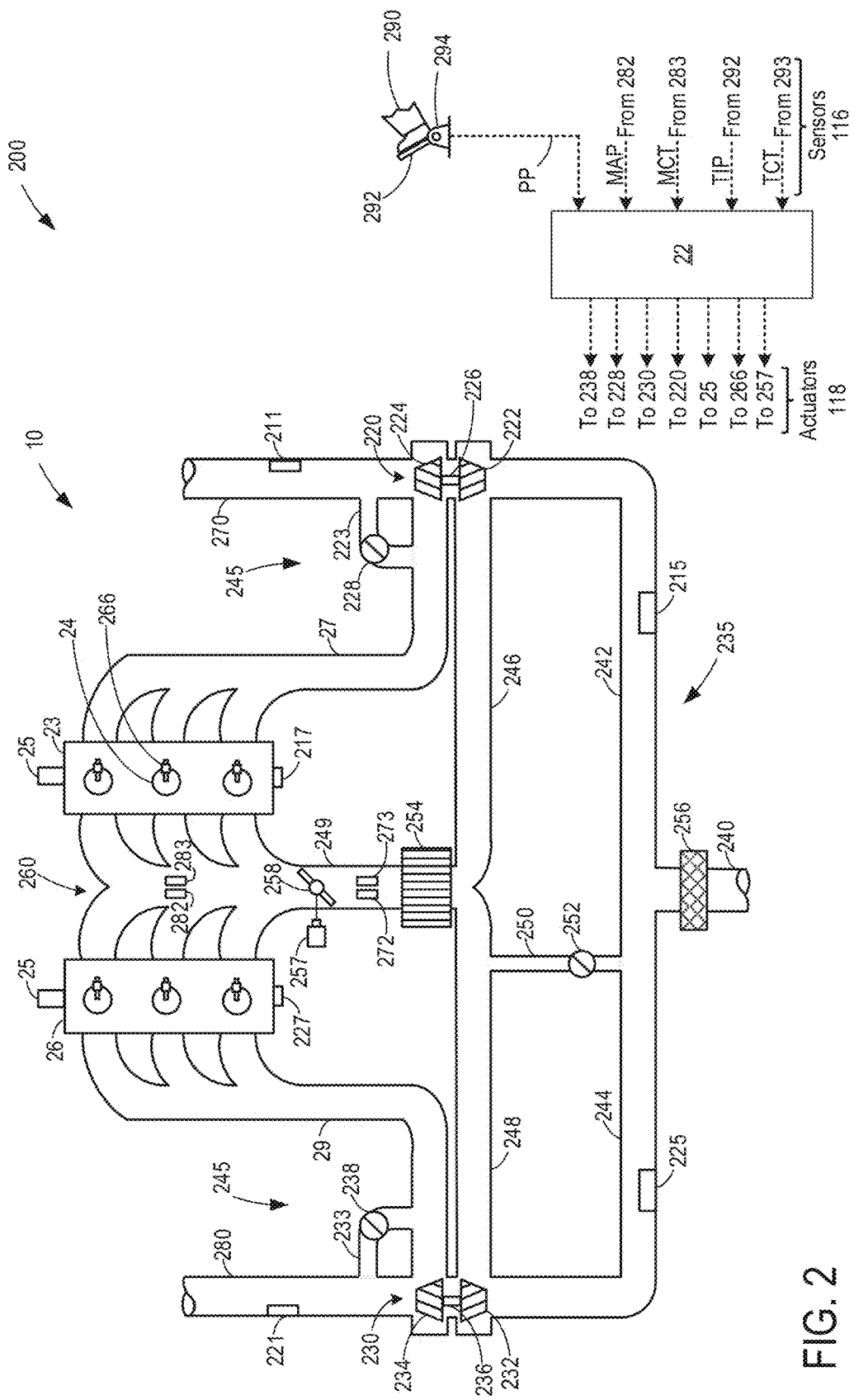
FIG. 2 shows an example boosted engine system configured with a turbocharger.

The following description relates to systems and methods for improving compressor outlet temperature control, such as in the example boosted engine system of FIG. 2, by using input from an external communication system (FIG. 1). A controller may be configured to perform a routine, such as the example routines of FIGS. 3-4, to model compressor outlet temperature. The controller may use a map, such as the map of FIG. 5, relating engine torque and engine speed to instantaneous compressor outlet temperature. An example of the regulation of engine torque, compressor speed, and compressor outlet temperature using previewed information is shown with reference to FIGS. 6A and 6B. Another example temperature regulation operation is shown in FIG. 7. In this way, a compressor outlet temperature can be regulated to reduce overheating without excessively limiting engine torque output.

FIG. 1 shows an example embodiment 100 of a vehicle system 110 in communication with an external network (cloud) 160 and a fleet of vehicles 120. The vehicle may be an on-road vehicle that is propelled via an internal combustion engine 10. The engine may be a boosted engine system including a turbocharger, as elaborated with reference to FIG. 2.

Vehicle system 110 may include a vehicle control system 112 for controlling vehicle operations. Vehicle control system 112 may include a controller 114. A navigation system 154 may be coupled to the control system 112 to determine a location of the vehicle 110. The navigation system 154 may be connected to an external server and/or network cloud 160 via wireless communication 150 in order to retrieve one or more inputs such as vehicle data, navigation data, map data, terrain data, and weather data from the network. The retrieved inputs may be stored on and communicated with controller 114. As an example, the navigation system 154 may determine the current location of the vehicle 110 and/or may obtain current ambient condition data (such as temperature, pressure, etc.) from the network cloud 160.

The controller 114 may also be coupled to a wireless communication device 152 for direct communication of the vehicle 110 with a network cloud 160. Using the wireless communication device 152, the vehicle 110 may retrieve ambient condition data (such as temperature, barometric pressure, etc.) from the network cloud 160 for use in determining an instantaneous compressor outlet temperature. In addition, the wireless communication device 152 may retrieve information about traffic conditions, upcoming road-grade, and weather conditions.

Control system 112 is shown receiving information from a plurality of sensors 116, such as the example engine sensors described at FIG. 2, and sending control signals to a plurality of actuators 118, such as the example engine actuators described at FIG. 2. Based on signals received from the different sensors 116, the engine operations are regulated and consequently the controller 114 sends control signals to engine actuators 118.

Control system 112 may also be communicatively coupled to the control system of one or more vehicle of a fleet 120 of vehicles. The fleet 120 may comprise multiple vehicles 122, 124, 126, and 128. In one example, vehicles 122-128 may each be similar in make and model to the given vehicle 110. In alternate examples, vehicles 122-128 may be vehicles within a threshold distance of vehicle 110. In one example, the inlet air temperature may be measured by a remote vehicle 122 and transmitted to the given vehicle 110 via vehicle-to-vehicle communication 150. If the remote vehicle 122 and the given vehicle 110 are within a threshold distance, the inlet air temperature measured by the remote vehicle 122 may be similar to the inlet air temperature of the given vehicle 110. Vehicles 122-128 may be vehicles that are part of a common fleet as vehicle 110. Each vehicle of the fleet 120 may comprise a control system 112 similar to the control system 112 of vehicle 110. A navigation system 154 and a wireless communication device 152 may be coupled to the control system 112 of each vehicle in the fleet 120. The on-board controllers in the vehicles in the fleet may communicate with each other and to the on-board controller in vehicle 110 via their respective navigation system 154, via wireless communication device 152, and/or via other forms of vehicle-to-vehicle technology (V2V). The vehicles in the fleet 120 may also communicate with the network cloud 160 via wireless communication 150.

In this way, a vehicle 110 may communicate with remote sources (external network cloud, other vehicles) using one or more technologies, such as wireless communication, navigation system, and V2V. Various kinds of data (such as barometric pressure) may be exchanged among the vehicles and the network cloud and this data may be utilized in determining compressor outlet temperature, as detailed below.

Based on the current location of the vehicle, the controller 114 may estimate future routes for the vehicle and may retrieve road information for the list of estimated future routes, the road information including for example, the slope of the roads on the routes, type of roads on the routes (e.g., paved, gravel, dirt, etc.), traffic along the routes, stop signs, traffic lights, road hazards, etc. Further, the controller 114 may in some examples obtain weather data relating to the ambient conditions (e.g., precipitation amount, precipitation type, humidity, ambient temperature, ambient pressure, etc.), along the routes. In response to input from a vehicle operator regarding a desired destination, and/or desired route to a destination, the controller 114 may select a desired route from the list of future routes. However, in other examples, the controller 114 may select more than one route from the list of future routes in response to input from a vehicle operator regarding a desired destination. Thus, the controller 114, in response to a selection of a desired destination and/or route, may narrow the list of potential vehicle routes based on the selection.

The controller 114 may generate a first future engine output torque profile based on one or more of a predicted driver demanded torque request profile, future road information, and vehicle information. Based on the first future engine output torque profile and/or future ambient conditions, the controller 114 may estimate future engine operating conditions. The controller 114 may further limit a maximum allowable engine torque for current and/or future engine operation to maintain engine operating conditions within system constraints. For example, the controller 114 may limit a maximum allowable engine torque to maintain a compressor outlet temperature below a threshold temperature over the future horizon. In another example, the controller 114 may limit a maximum allowable engine torque to maintain a compressor speed below a threshold speed over the future horizon. In yet another example, the controller 114 may limit a maximum allowable engine torque to maintain a temperature of an intake conduit included between the compressor and a charge air cooler to below a threshold temperature. Other example system constraints are described below with reference to FIG. 3. In some examples, a reference governor may be used in combination with estimates of the future engine operating conditions to adjust the maximum allowable engine torque. Specifically, the reference governor may adjust a reference signal corresponding to, for example, a driver demanded engine torque request (e.g., input from a vehicle operator via an accelerator pedal), which may be used control operation of various engine actuators such as an intake throttle, turbocharger wastegate, fuel injectors, etc.

The controller 114 may generate a second future engine load profile based on the adjusted maximum allowable engine torque profile, and may estimate future engine operating conditions based on the second future engine load profile. Specifically, the controller 114 may estimate a future fuel injection profile for the future horizon. In this way, the controller 114 may estimate one or more future fuel injection profiles for one or more upcoming potential vehicle routes, where the estimated future fuel injection profiles may consider system constraints such as an outlet temperature of a turbocharger compressor. In this way, a more accurate estimate of fuel economy along two or more future routes may be obtained, and the controller 114 may select a more fuel efficient route to a desired location.

The controller 114 may estimate future engine operating conditions for one or more of the future routes based on the ambient conditions and future engine load profiles, where the future engine load profiles may be at least partly estimated based on the road information. The future engine operating conditions may include one or more of future compressor outlet temperatures, boosted air temperatures, torque demands, exhaust back-pressures, spark timing, fuel injection amount, compressor speed, boosted air pressure, etc., for one or more of the future routes. Thus, engine operating conditions over a future horizon may be predicted based on the predicted engine load and predicted ambient conditions. As described above, the road information and ambient conditions for the future routes may be estimated based on data received from the network cloud 160.

Specifically, the controller 114 may predict a future compressor outlet temperature profile and/or a future intake conduit material temperature (e.g., a temperature of an intake conduit tubing coupling the compressor to the charge air cooler) based on one or more of the future engine load profiles and ambient conditions. In one example, the engine load may be used to determine an intake air mass-flow rate, which in turn may be used with a barometric pressure estimate to determine an exhaust back-pressure estimate. The exhaust back-pressure may then be used to infer a compression pressure ratio, and therefrom a compressor outlet temperature may be modeled. The modeled compressor outlet temperature may then be filtered to model an intake conduit material temperature (of the material in the intake conduit coupling the compressor outlet to the charge air cooler) over the future horizon.

As another example, the future compressor outlet temperature profile and/or intake conduit material temperature profile may be adjusted based on ambient conditions, such as temperature. For example, as the ambient temperature increases, the temperature of the compressor outlet and/or intake conduit material may increase. Further, changes in ambient humidity may affect the rate of heat transfer between intake air and the intake components. Specifically, as ambient humidity increases, the heat transfer between the intake air and the intake components may increase.

As yet another example, the controller 114 may estimate the future compressor outlet temperature profile and/or intake conduit material temperature profile based on future engine operating conditions. As one example, based on the predicted engine load profile, the controller 114 may estimate whether exhaust gas recirculation (EGR) will be desired. If EGR is predicted, the future compressor outlet temperature profile and/or intake conduit material temperature profile may be adjusted based on one or more of a predicted amount of EGR, a predicted temperature of the EGR gasses, etc. For example, when the low-pressure EGR gasses are hotter than the intake air, enabling low-pressure EGR may heat the intake gasses and thus heat the compressor outlet and/or intake conduit material. Further, in examples, where high-pressure EGR gasses are hotter than boosted air, enabling high-pressure EGR may increase the temperature of the boosted air and/or the intake conduit material.

The controller 114 may then limit an engine torque output based on the modeled compressor outlet temperature profile so as to maintain each of the compressor outlet temperature and the intake conduit material temperature below respective thresholds. The controller 114 may limit the engine torque output by one or more of closing an intake throttle supplying intake air to the engine 10, opening a wastegate to reduce an amount of boost provided to the intake air, etc.

The future engine load profiles may be estimated by the controller 114 based on one or more of a future driver demanded torque request, predicted vehicle weight, road information such as road slope, and various auxiliary loads on the engine such as an A/C compressor, alternator, supercharger, coolant pump, etc.

Future driver demanded torque requests may be estimated based on one or more of the road information, driver habits, engine load history, and ambient condition data. As one example, the predicted engine load may increase for increases in the incline slope of the road on which the vehicle system 110 is travelling. Further, the future driver demanded torque requests may be estimated based on vehicle operator characteristics, such as for example, the driver repeatedly requesting less torque than would be sufficient to maintain the current vehicle speed when the incline slope of the road increases. Thus, vehicle operator preferences (e.g., desire to increase fuel economy when driving uphill by reducing vehicle speed) may be considered when estimating future driver demanded torque requests.

Further, the future driver demanded torque requests may be estimated based on an engine load history. For example, a future engine load estimate may be adjusted based on the engine load history and road information for previous routes, where the future engine load estimate may be further adjusted based on an amount of similarity between the upcoming road information and the road information for the previous routes. Specifically, in some examples, a probability distribution for potential engine loads along a future route may be estimated based on the engine load history, and in particular, the probability distribution may be constructed based on an amount of similarity between the road information for the previous routes and the future/upcoming routes. Thus, for each future route, a plurality of potential engine load profiles may be constructed, each engine load profile assigned a probability based on an amount of similarity between the future route and a previous route which had the same and/or similar engine load profile. As such, a confidence interval may be constructed for the future driver demanded torque requests based on the probability distribution. Thus, the future engine load profile may be modeled more closely to previous engine load profiles for which the road information is more similar to that of the upcoming route. As an example, the future engine load profile may be the same or similar to a previous engine load profile for which the route had the same or similar slope, vehicle weight, etc., to that of the current/future route.

The future engine load profile may additionally or alternatively be estimated based on ambient conditions. For example, in response to a predicted increase in ambient temperature, it may be determined that the A/C compressor will be turned on to cool a passenger cabin of the vehicle system 110, and thus the predicted engine load may increase for the duration during which the A/C compressor is powered on. Thus, the estimated future boost pressure, intake air temperature, and compressor outlet temperature may be increased to compensate for the increased engine load.

Further, the future engine load profile may additionally or alternatively be estimated based on various auxiliary loads. As one example, if it is determined that a vehicle battery will decrease below a threshold state of charge, and thus an increase in alternator torque is predicted, then the predicted engine load torque may increase for the duration during which the alternator torque is increased to charge the battery. As such, the engine output torque may be increased for the duration during which the alternator torque is increased to compensate for the increased engine load.

As another example, if it is determined that the engine temperature and/or engine coolant temperature will increase above respective levels, and that an increase in cooling of the coolant is desired, the future engine load profile estimate may be increased to compensate for increased power supply to one or more pumps and/or condensers of various cooling systems of the vehicle system 110.

FIG. 2 shows a schematic depiction of an example turbocharged engine system 200 including a multi-cylinder internal combustion engine 10 and twin turbochargers 220 and 230. Engine system 200 may include an air intake system 235 for inducting air into the engine 10, and an exhaust system 245 for exhausting products of combustion of the engine 10 to the atmosphere. As one non-limiting example, engine system 200 can be included as part of a propulsion system for a passenger vehicle, such as vehicle system 110 of FIG. 1. Engine system 200 can receive intake air via intake passage 240. Intake passage 240 can include an air filter 256. At least a portion of the intake air can be directed to a compressor 222 of turbocharger 220 via a first branch of the intake passage 240 as indicated at 242 and at least a portion of the intake air can be directed to a compressor 232 of turbocharger 230 via a second branch of the intake passage 240 as indicated at 244.

The first portion of the total intake air can be compressed via compressor 222 where it may be supplied to intake manifold 260 via intake air conduit 246. Intake passages 242 and 246 form a first branch of the air intake system 235 of the engine system 200. Similarly, a second portion of the total intake air can be compressed via compressor 232 where it may be supplied to intake manifold 260 via intake air passage 148. Thus, intake passages 244 and 248 form a second branch of the engine's air intake system.

As shown in FIG. 2, intake air from intake passages 246 and 248 can be recombined via a common intake passage 249 before reaching intake manifold 260, where the intake air may be provided to the engine. In some examples, intake manifold 260 may include an intake manifold pressure sensor 282 for estimating a manifold pressure (MAP) and/or an intake manifold temperature sensor 283 for estimating a manifold air temperature (MCT), each communicating with controller 22. Intake passage 249 includes a charge air cooler 254 and/or an intake throttle 258 coupled to the intake manifold 260. The position of the intake throttle can be adjusted by the control system via an intake throttle actuator 257 communicatively coupled to controller 22. Controller 22 may be the same or similar to controller 114 described above with reference to FIG. 1. Thus, controller 22 may receive road information and/or weather information regarding ambient conditions from one or more remote servers such as network cloud 160 described above with reference to FIG. 1.

The compression of intake air by compressors 222, 232 may result in high compressor outlet temperatures, wherein the actual compressor outlet temperature includes a temperature of boosted intake gasses included between turbocharger compressors 222, 232 and an intercooler 254. The intercooler 254 is coupled downstream of the compressors 222, 232 via a tubing. The charge air cooler 254 may be used to cool the aircharge compressed by compressors 222, 232 prior to delivery to the engine. Extreme compressor outlet temperatures can result in compressor coking wherein the oxidation of oil droplets form abrasive deposits on compressor 222, 232 bearings, resulting in premature hardware degradation, and related warranty issues. The high temperature air passes through the intake air conduits 246, 248 before being cooled by the charge air cooler 254. To reduce component costs, a tubing of the intake air conduits 246, 248 coupling the outlet of compressors 222, 232 to the charge air cooler 254 may be made from plastic. However, this tubing may be prone to degradation at high temperatures. In one example, high temperatures could be experienced at the compressor outlet and in the intake air conduits 246, 248 during wide open pedal conditions, such as at high loads. To reduce compressor coking and tubing degradation, compressor outlet temperatures may be controlled so as to maintain them before a threshold temperature. In addition, as elaborated herein with reference to FIG. 3, engine torque requirements are predicted and if compressor outlet temperature is predicted to exceed a threshold, engine torque is limited over a time horizon to decrease the compressor outlet temperature. In this way, a temperature experienced in the intake air conduits 246, 248 may be maintained below degradation limits.

As shown in FIG. 2, an anti-surge valve 252 may be provided to selectively bypass the compressor stages of turbochargers 220 and 230 via bypass passage 250. As one example, anti-surge valve 252 can open to enable flow through bypass passage 250 when the intake air pressure upstream of the compressors attains a threshold value.

Engine 10 may include a plurality of cylinders 24. In the depicted example, engine 10 includes six cylinders arranged in a V-configuration. Specifically, the six cylinders are arranged on two banks 23 and 26, with each bank including three cylinders. Engine speed sensors 217 and 227 measure the engine speed for banks 23 and 26 respectively. In alternate examples, engine 10 can include two or more cylinders such as 4, 5, 8, 10 or more cylinders. These various cylinders can be equally divided and arranged in alternate configurations, such as V, in-line, boxed, etc. Each cylinder 24 may be configured with a fuel injector 266. In the depicted example, fuel injector 266 is a direct in-cylinder injector. However, in other examples, fuel injector 266 can be configured as a port based fuel injector.

Intake air supplied to each cylinder 24 via common intake passage 249 may be used for fuel combustion and products of combustion may then be exhausted via bank-specific exhaust passages. In the depicted example, a first bank 23 of cylinders of engine 10 can exhaust products of combustion via a common exhaust passage 27 and a second bank 26 of cylinders can exhaust products of combustion via a common exhaust passage 29.

Products of combustion that are exhausted by engine 10 via exhaust passages 27 can be directed through exhaust turbine 224 of turbocharger 220, which in turn can provide mechanical work to compressor 222 via shaft 226 in order to provide compression to the intake air. Alternatively, some or all of the exhaust gases flowing through exhaust passage 27 can bypass turbine 224 via turbine bypass passage 223 as controlled by wastegate 228. The position of wastegate 228 may be controlled by an actuator (not shown) as directed by controller 22. As one non-limiting example, controller 22 can adjust the position of the wastegate 228 via a solenoid valve. In this particular example, the solenoid valve may receive a pressure difference for facilitating the actuation of wastegate 228 via the actuator from the difference in air pressures between intake passage 242 arranged upstream of compressor 222 and intake passage 249 arranged downstream of compressor 222. In other examples, other suitable approaches other than a solenoid valve may be used for actuating wastegate 228.

Similarly, products of combustion that are exhausted by engine 10 via exhaust passage 29 can be directed through exhaust turbine 234 of turbocharger 230, which in turn can provide mechanical work to compressor 232 via shaft 236 in order to provide compression to intake air flowing through the second branch of the engine's intake system. Alternatively, some or all of the exhaust gases flowing through exhaust passage 29 can bypass turbine 234 via turbine bypass passage 233 as controlled by wastegate 238. The position of wastegate 238 may be controlled by an actuator (not shown) as directed by controller 22. As one non-limiting example, controller 22 can adjust the position of wastegate 238 via a solenoid valve. In this particular example, the solenoid valve may receive a pressure difference for facilitating the actuation of wastegate 238 via the actuator from the difference in air pressures between intake passage 244 arranged upstream of compressor 232 and intake passage 249 arranged downstream of compressor 232. In other examples, other suitable approaches other than a solenoid valve may be used for actuating wastegate 238. In a boosted engine, the wastegates 228, 238 may act as secondary actuators, regulating the amount of exhaust gas flowing through turbines 224, 234. The wastegates 228, 238 control the power delivered to compressors 222, 232 via a direct mechanical connections 226, 236. In one example, as the wastegate 228 is closed, the airflow through turbine 224 increases resulting in a higher compressor speed and increased boost pressure. As the wastegate 228 is opened, the airflow through turbine 224 decreases, resulting in a lower compressor speed and decreased boost pressure.

Products of combustion exhausted by the cylinders via exhaust passage 27 may be directed to the atmosphere via exhaust passage 270 while combustion products exhausted via exhaust passage 19 may be directed to the atmosphere via exhaust passage 280. Exhaust passages 270 and 280 include exhaust gas pressure sensors 211 and 221 respectively. Exhaust passages 270 and 280 may also include one or more exhaust after-treatment devices, such as a catalyst, and one or more exhaust gas sensors in addition to the exhaust gas pressure sensors 211, 221.

The position of intake and exhaust valves of each cylinder 24 may be regulated via hydraulically actuated lifters coupled to valve pushrods, or via a cam profile switching mechanism in which cam lobes are used. In this example, at least the intake valves of each cylinder 24 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 200 can include various other sensors. For example, each of intake passages 242 and 244 can include a mass air flow sensor (not shown) and/or inlet air temperature (IAT) sensors 215 and 225, each communicating with controller 22. In some examples, only one of intake passages 242 and 244 can include a mass air flow (MAF) sensor. In some examples, intake manifold 260 may include an intake manifold pressure (MAP) sensor 282 and/or an intake manifold temperature sensor 283, each communicating with controller 22. In some examples, a barometric pressure sensor may be integrated into the MAP sensor 282, each communicating with controller 22. In some examples, common intake passage 249 may include a throttle inlet pressure (TIP) sensor 292 for estimating a throttle inlet pressure (TIP) and/or a throttle inlet temperature sensor 293 for estimating a throttle air temperature (TCT), each communicating with controller 22.

Engine 10 may receive control parameters from controller 22 and input from a vehicle operator 290 via an input device 292. In this example, input device 292 includes an accelerator pedal and a pedal position sensor 294 for generating a proportional pedal position signal PP. In response to the input received from the vehicle operator, controller 22 can be configured to adjust the amount of boost provided by turbochargers 220 and 230. In one example, controller 22 may limit an engine boost responsive to a rise in measured or modeled compressor outlet temperature by sending a signal to a throttle actuator 257 to adjust the position of throttle 258. As a result, the opening of throttle 258 is reduced, limiting the amount of aircharge received in the intake manifold. In another example, controller 22 may limit the engine torque by sending a signal to a wastegate actuator coupled to wastegates 228 and 238 to increase the opening of the wastegates, thereby increasing an amount of exhaust that bypasses turbines 224 and 234, and reducing turbine speed.

Engine system 200 may further include control system 112. Control system 112 is shown receiving information from a plurality of sensors 116 (various examples of which are described herein) and sending control signals to a plurality of actuators 118 (various examples of which are described herein). As one example, sensors 116 may include MAP sensor 282, engine speed sensors 217 and 227, MCT sensor 283, inlet air temperature (IAT) sensors 215 and 225, throttle inlet pressure (TIP) sensor 292, exhaust pressure sensors 211 and 221. Other sensors such as additional pressure, temperature, air/fuel ratio, and composition sensors may be coupled to various locations in engine system 200. The actuators 118 may include, for example, throttle 258, anti-surge valve 252, wastegates 228 and 238, and fuel injector 266. The control system 112 may include a controller 22. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 3-4. For example, in response to a predicted compressor outlet temperature over the future horizon of engine operation exceeding a threshold, the controller may send a signal to a throttle actuator to move the intake throttle to a less open position, thereby limiting engine intake airflow and reducing engine torque.

In this way, the system of FIGS. 1-2 provides for a vehicle system comprising an engine including an intake manifold; an intake throttle coupled to the intake manifold; an intake compressor coupled upstream of the intake throttle for providing a boosted aircharge to the intake manifold; an intercooler coupled downstream of the intake compressor via a tubing; a navigation system communicatively coupled to a network, the navigation system configured to retrieve one or more inputs including vehicle data, navigation data, location data, map data, terrain data, and weather data from the network; and a controller. The controller may be configured with computer readable instructions stored on non-transitory memory for: estimating actual and predicted engine operating conditions for an upcoming segment of vehicle travel based on the one or more inputs retrieved at the navigation system; calculating a compressor outlet temperature profile for the upcoming segment of vehicle travel based on the estimated actual and predicted engine operating conditions; and maintaining an actual compressor outlet temperature below a threshold temperature via adjustments to the intake throttle, the adjustments responsive to the calculated compressor outlet temperature profile. The maintaining may include reducing an engine torque below a threshold torque by reducing an opening of the intake throttle responsive to a predicted temperature of the calculated compressor outlet temperature profile exceeding a threshold temperature, the threshold torque based at least on a driver torque demand, the threshold temperature based at least on a material property of the tubing. The calculating may include estimating an engine torque for the upcoming segment of vehicle travel based on the estimated actual and predicted engine operating conditions; converting the estimated engine torque into an estimated engine air mass-flow rate; estimating an exhaust back-pressure based on each of the estimated engine air mass-flow rate and barometric pressure; mapping each of an intake manifold pressure and a throttle inlet pressure based on the exhaust back-pressure; estimating a compressor pressure ratio based on each of the estimated engine air mass-flow rate, the throttle inlet pressure, and the exhaust back-pressure; estimating a compressor efficiency based on each of the estimated engine air mass-flow rate, the compressor pressure ratio, and an inlet air temperature; and predicting the compressor outlet temperature profile based on each of the estimated compressor efficiency, the inlet air temperature, and the compressor pressure ratio.

Figure 3:
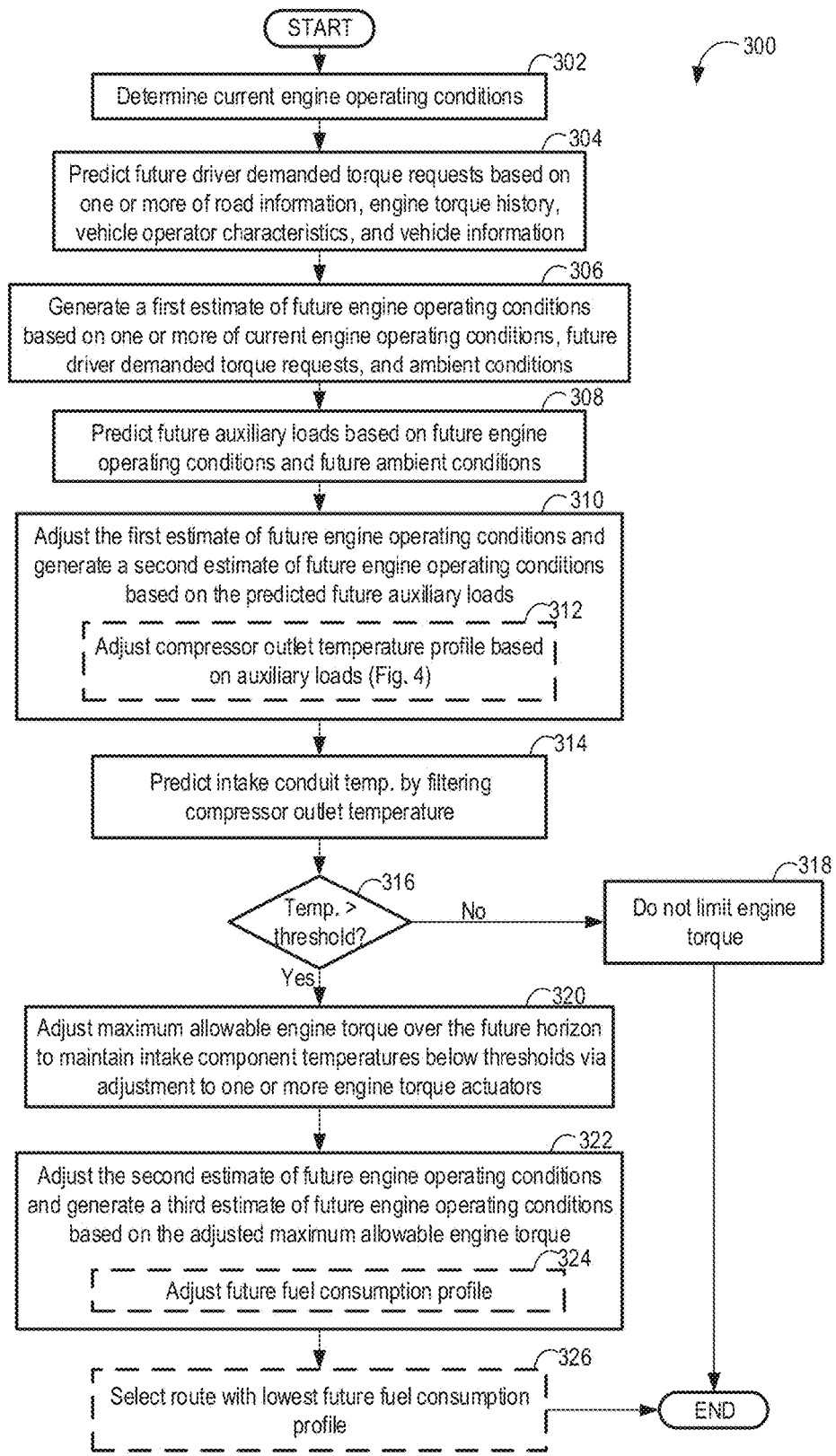
FIG. 3 shows a high level flow chart illustrating an example method to predict a compressor outlet temperature based on current and predicted engine operating conditions and actuate engine actuators to limit engine torque based on the compressor outlet temperature.

FIG. 3 illustrates an example method 300 for predicting changes in engine torque over a future horizon, and then predicting corresponding changes in a compressor outlet temperature. In particular, method 300 uses current and predicted engine operating conditions, as determined based on existing vehicle sensors and based on input from external vehicle communications, to predict compressor outlet temperatures. An intake conduit temperature may be modeled based on a predicted compressor outlet temperature. Engine torque actuators are then used to limit a torque horizon in order to maintain the instantaneous compressor outlet temperature below a threshold, thereby also maintaining the intake conduit temperature below a threshold. As used herein, the torque horizon refers to the time span over which the engine operating conditions and, using the methods claimed herein, the instantaneous compressor outlet temperature are predicted. In this way, a compressor outlet temperature may be accurately predicted and controlled without requiring actual measurement of the temperature. However, in alternate examples, the current and predicted engine operating conditions may be based on a measured compressor outlet temperature.

Further, the method may additionally comprise estimating an amount of fuel to be consumed over the future torque horizon considering the imposed torque limits used to maintain the compressor outlet temperature below the threshold. The future torque horizon may be predicted for a particular upcoming route. However, it should be appreciated that the future torque horizon and corresponding future vehicle operating conditions may be predicted for more than one upcoming route. In such example, the method may comprise selecting a route with the lowest fuel consumption.

The instructions for carrying out method 300 and the rest of the methods included herein may be executed by a controller (e.g., controller 22 described above in FIG. 2) based on instructions stored on a memory of the controller and in conjunction with signals received from external vehicle communications. The controller may employ engine actuators of the engine system to adjust engine operation, according to the methods described below.

At 302, the method 300 comprises estimating and/or measuring vehicle operating conditions, including current engine operating conditions. The estimated conditions may include, for example, engine speed, driver demanded torque, which may be estimated based on the position of an accelerator pedal as explained above with reference to FIG. 2, ambient conditions (ambient temperature, barometric pressure, ambient humidity, etc.), EGR level, engine temperature, exhaust catalyst conditions (such as catalyst temperature and oxygen loading), fuel level, fuel octane of available fuel(s), etc. Ambient conditions may be estimated based on weather data wirelessly received from one or more remote servers (e.g., network cloud 160 described above in FIG. 1). The engine operating conditions may further include for example, exhaust back-pressure, intake air temperature, manifold absolute pressure (MAP), boost pressure, fuel injection amount, spark timing, intake mass airflow, charge state of a vehicle battery, auxiliary loads such as an A/C compressor, coolant pump, etc., intake compressor outlet temperature, intake conduit temperature (e.g., temperature of conduit 248 described above in FIG. 2), compressor speed, pressure differential across the compressor (e.g., compressor 232 described above in FIG. 2). At 306, upon enabling boosted engine operation, future engine torque required over the future horizon of vehicle operation may be predicted based on current and future vehicle and engine operating conditions. Vehicle and engine operating conditions may further include one or more of each of a vehicle weight, an engine size, a vehicle speed, an engine load, barometric pressure, a compressor pressure ratio, compressor efficiency, and throttle inlet pressure. Still other vehicle operating conditions may include information pertaining to the route of travel, grade of travel, etc.

The vehicle operating conditions may be determined based on existing vehicle sensors and external vehicle communications. For example, current and future vehicle operating conditions may be retrieved (e.g., downloaded) from vehicle-to-vehicle technology, a navigation system, and one or more remote server (e.g., network cloud 160 described above in FIG. 1).

When using vehicle-to-vehicle technology, the controller may retrieve current and future vehicle operating conditions from related vehicles (e.g., same or similar make and model) communicatively coupled to the given vehicle over a network. The vehicles may be part of a common fleet of vehicles, vehicles of a similar make and/or model, vehicles operational within a threshold radius of the given vehicle, or combinations thereof. The given vehicle may include an on-board controller that is communicatively coupled to the on-board controller of each of the remote vehicles via a network, and information may be retrieved from the on-board controller of at least one of the one or more remote vehicles. As such, various data may be retrieved from any or all of the external vehicle communications, such as weather information, traffic information, road grade information, and navigation/route information. The communicating vehicles may be within a defined threshold radius of the given vehicle. The threshold radius may be varied based on the data being conveyed. In one example, weather information may be substantially constant over longer distances, so a longer threshold distance may be set to receive weather information from a remote vehicle. In comparison, traffic conditions may be used in the prediction of operating conditions if the remote vehicle is within a smaller threshold distance. Other information retrieved via V2V technology may include, for example, data pertaining to weather, road conditions, and traffic conditions at a location the vehicle is driving to.

A navigation system may be communicatively coupled to a controller of the vehicle and also communicatively coupled to an off-board server, such as via wireless communication, and the vehicle operating conditions may additionally or optionally be retrieved from the off-board server onto the on-board controller via the navigation system. The navigation system may determine the location (e.g. global positioning system (GPS) co-ordinates) of the vehicle. The vehicle location may be used to determine relevant information including upcoming road-grade, route, local weather, and traffic information to be used in the determination of current and future engine operating conditions. The navigation system may communicate with a remote off-board controller, such as with an external server or cloud network to obtain information such as driving conditions, ambient conditions (pressure, temperature, etc.), and traffic and navigation information at the vehicle location. In one example, the driving route may be pre-defined by user input to the navigation system.

At 304, the method comprises predicting future driver demanded torque requests based on one or more of road information, engine torque output history, vehicle operator characteristics, and vehicle information. As described above, the road information may include one or more of a slope of the road, navigation information (e.g., turn angle, speed limit, etc.), and traffic information such as traffic lights, traffic signs, traffic information, road hazards, etc., of an upcoming route on which the vehicle may proceed along a future horizon. Predicting future engine torque requirements may utilize external vehicle communication, or communications between the operator vehicle and one or more external devices including but not limited to remote databases or networks, cloud storage, remote vehicles, and GPS location satellites via communication methods including wireless communication.

For example, an amount of torque requested in the future may increase for increases in the incline slope of the road. As another example, traffic information may be used to predict frequent changes in turbocharger demand due to frequent accelerating and braking in traffic. In another example, the navigation system may communicate with a remote off-board controller, such as with an external server or cloud network to obtain road grade information, determining engine load. For example, an increase in engine load may be predicted responsive to an upcoming incline. As another example, based on a driver behavior history, changes in engine torque may be predicted. For example, higher average engine torques may be predicted when the operator drives more aggressively. As another example, frequent torque transients may be predicted when the operator drives in-city as compared to on a highway. In another example, traffic and navigation information may be used in conjunction with driver behavior history to predict an upcoming wide-open throttle event requiring boosted engine operation and the likely time of engine boosting in the future horizon. In still further examples, traffic information may include traffic speed, location of traffic, and traffic movement patterns. Traffic patterns with short accelerations followed by quick deceleration may predict a transient engine boosting condition. Navigation information may include vehicle location, information about the route taken (turn angle, speed limit, etc.), and road grade information. In one example, an upcoming turn may predict vehicle deceleration to safely turn, reducing engine torque. Thus, based on the road information, an amount of torque requested by the driver over the future horizon may be estimated.

The future driver demanded torque requests may additionally or alternatively be estimated based on vehicle operator characteristics, such as for example, the driver repeatedly requesting less torque than would be sufficient to maintain the current vehicle speed when the incline slope of the road increases. As another example, the torque requests may be predicted based on an average torque request from the vehicle operator when accelerating from a stop, such as from a stop light or stop sign. Thus, vehicle operator preferences (e.g., desire to increase fuel economy when driving uphill by reducing vehicle speed) may be considered when estimating future driver demanded torque requests. The vehicle operator preferences may also be referred to herein as driver habits.

The driver habits may be statistically determined and stored in the vehicle's controller memory or on the navigation system. The driver behavior history may include statistical information regarding how aggressively the operator drives (e.g., whether they are accelerator and/or brake pedal heavy, lead-footed, etc.), braking and accelerating patterns, as well as the operator's preference for performance vis-a-vis fuel economy. In addition, the driver behavior history may be determined based on routes the operator tends to select on the navigation system (e.g., based on a preference for highways versus city roads), times of vehicle operation, speed of vehicle travel (e.g., whether the operator abides by speed rules or tends to exceed the designated speed), cabin settings used during vehicle travel (e.g., whether the operator heavily uses an air-conditioning), etc.

Weather information, which may include weather conditions (rain, snow, fog, etc.), road conditions due to weather conditions (wet, icy, etc.), and ambient conditions (pressure, temperature, humidity, etc.), may additionally or alternatively be used to predict future engine torque requests. In one example, a wet road surface may predict an increase in requested engine torque to provide sufficient traction.

Additionally or alternatively, the future driver demanded torque requests may be estimated based on an engine torque output history. For example, a future driver demanded torque requests profile may be adjusted based on the engine load history and road information for previous routes, where the future driver demanded torque requests may be further adjusted based on an amount of similarity between the upcoming road information and the road information for the previous routes. Specifically, in some examples, a probability distribution for potential driver demanded torque requests along a future route may be estimated based on the engine load history, and in particular, the probability distribution may be constructed based on an amount of similarity between the road information for the previous routes and the future/upcoming routes. Thus, for each future route, a plurality of potential driver demanded torque request profiles may be constructed, each torque request profile assigned a probability based on an amount of similarity between the future route and a previous route which had the same and/or similar torque request profile. As such, a confidence interval may be constructed for the future driver demanded torque requests based on the probability distribution. Thus, the future driver demanded torque request profile may be modeled more closely to previous driver demanded torque request profiles for which the road information is more similar to that of the upcoming route. As an example, the future driver demanded torque request profile may be the same or similar to a previous driver demanded torque request profile for which the route had the same or similar slope, vehicle weight, etc., to that of the upcoming route.

Additionally or alternatively, the future driver demanded torque requests may be estimated based on vehicle information such as vehicle weight. For example, the future driver demanded torque requests may increase for increases in the vehicle weight.

Method 300 may then continue from 304 to 306 which comprises generating a first estimate of future engine operating conditions based on one or more of current engine operating conditions, future driver demanded torque requests, and ambient conditions. The future engine operating conditions may be the same or similar to current engine operating conditions, except that the future engine operating conditions may be engine operating conditions over the future horizon. Thus, the future engine operating conditions may include one or more of a future compressor outlet temperature, engine temperature, intake mass airflow, fuel injection amount, exhaust back-pressure, boost pressure, etc. Thus, the method 300 at 306 may comprise generating the first estimate of the future engine operating conditions based on the current engine operating conditions estimated at 302, and the future torque requests estimated at 304. Thus, the method 300 at 306 may comprise estimating how current engine operating conditions will change over the future horizon in response to the predicted torque requests. For example, the engine temperature, boost pressure, mass airflow, and compressor outlet temperature may increase for increases in the torque request over the future horizon.

Additionally or alternatively, the method 300 at 306 may comprise using future ambient conditions to generate the first estimate of future engine operating conditions. For example, the intake air temperature, boosted air temperature, engine temperature, and compressor outlet temperature may increase for increases in the ambient air temperature. As another example, wind and/or precipitation may increase the efficiency of a charge air cooler (e.g., CAC 254 described above in FIG. 2), and may thus affect a temperature of boosted air provided to one or more engine cylinders. Thus, changes in the ambient conditions may affect engine operating conditions over the future horizon.

Method 300 may then proceed from 306 to 308 which comprises predicting future auxiliary loads based on future engine operating conditions and future ambient conditions. For example, in response to a predicted increase in ambient temperature, it may be determined that an A/C compressor will be turned on to cool a passenger cabin of a vehicle (e.g., vehicle system 110 described above in FIG. 1), and thus the predicted auxiliary load may increase for the duration during which the A/C compressor is powered on. Thus, one or more of the estimated future fuel consumption, boost pressure, intake air temperature, and compressor outlet temperature may be increased to compensate for the increased engine load.

As another example, if it is determined that a vehicle battery will decrease below a threshold state of charge, then an increase in alternator torque may be predicted. Thus, the predicted auxiliary load may increase for the duration during which the alternator torque is increased to charge the battery. As such, the engine output torque may be increased for the duration during which the alternator torque is increased to compensate for the increased engine load.

As another example, if it is determined that the engine temperature and/or engine coolant temperature will increase above respective levels, and that an increase in cooling of the coolant is desired, the future auxiliary load estimate may be increased to compensate for increased power supply to one or more pumps and/or condensers of various cooling systems of the vehicle.

Figure 4:
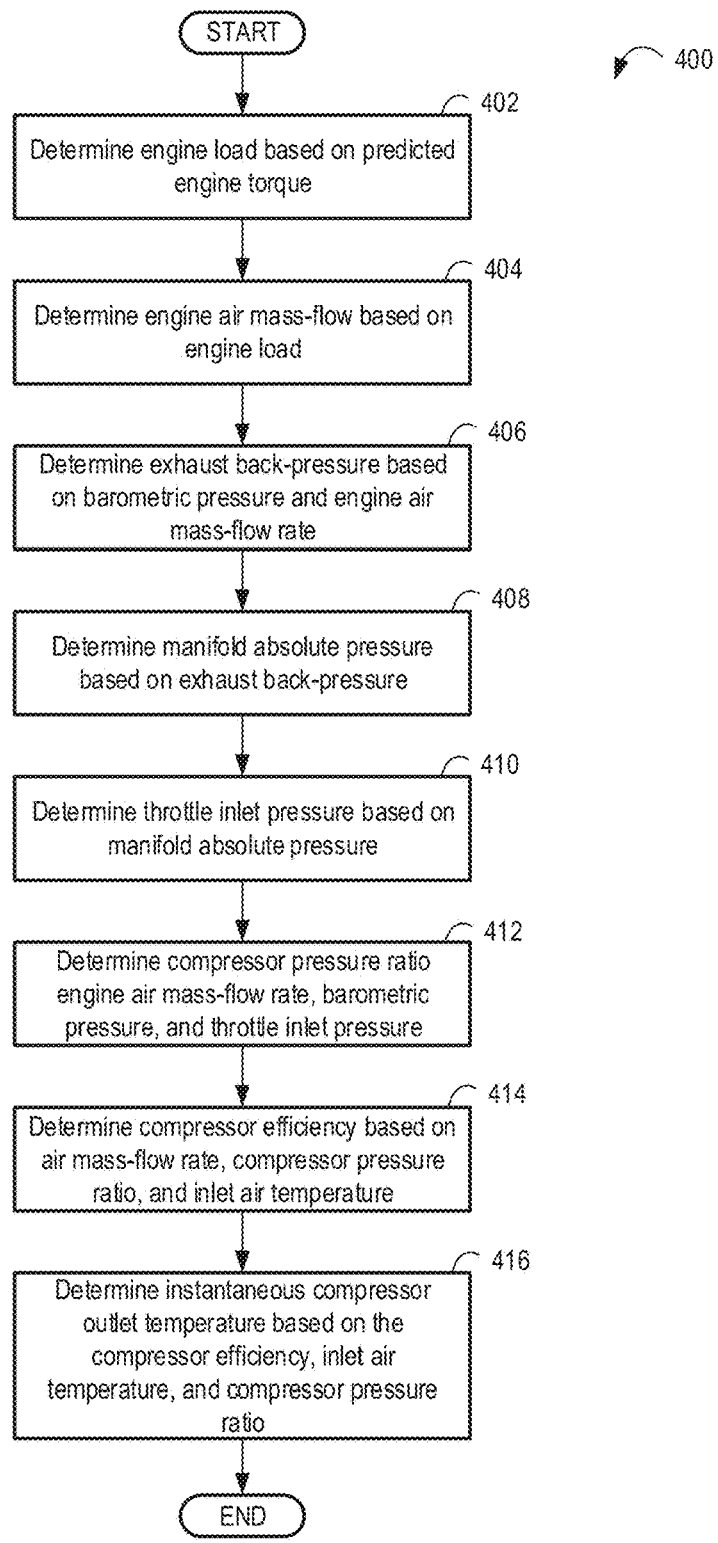
FIG. 4 shows a flow chart depicting the determination of an instantaneous compressor outlet temperature based on current and predicted vehicle conditions.

Method 300 may continue from 308 to 310 which comprises adjusting the first estimate of future engine operating conditions and generating a second estimate of future engine operating conditions based on the predicted future auxiliary loads. Thus, based on the predicted future auxiliary loads, engine operating conditions such as fuel consumption, compressor outlet temperature, etc., may be adjusted to compensate for the auxiliary loads. For example, in response to increased auxiliary loads, the engine torque output, and therefore fuel consumption may be increased to compensate for the increased auxiliary loads when it is desired to maintain engine speed. As a result, compressor outlet temperatures may be increased due to the increased auxiliary loads. Thus, the method 300 at 310 may in some examples comprise adjusting the predicted compressor outlet temperature profile based on the predicted auxiliary loads at 312. Thus, the method 300 at 312 comprises utilizing the predicted engine torque requests over the future horizon of the vehicle operation, and/or vehicle information, such as vehicle weight, engine size, and engine sensor measurements, and/or auxiliary loads to predict a future compressor outlet temperature profile as detailed in FIG. 4, wherein the future compressor outlet temperature profile includes a predicted compressor outlet temperature over time points of vehicle operation. As such, the predicted future compressor outlet temperature profile may be an initial profile that is subsequently further adjusted or filtered. FIG. 4 illustrates an example method of mapping engine torque and engine speed to compressor outlet temperature using current and predicted vehicle operating conditions.

Method 300 may then continue from 310 to 314 which comprises predicting a temperature of an intake conduit (e.g., conduit 248 described above in FIG. 2) included between the intake compressor and the charge air cooler the initial future compressor outlet temperature over the future horizon by filtering the compressor outlet temperature profile. Thus, the predicted future compressor outlet temperature profile generated at 312 may be used to model the intake conduit temperature over the future horizon. In one example, the intake conduit temperature may be modeled as a low-pass filtered version of the instantaneous compressor outlet temperature, accounting for thermodynamic effects such as convection and conduction of heat from the air into the material. In one example, the filtering includes determining a bandpass of the filter based on a material property of the intake conduit tubing. In alternate examples, the initial temperature may be filtered or processed via a high-pass filter, a rolling average filter, etc.

Method 300 then proceeds from 314 to 316 which comprises determining if predicted temperatures of one or more components in an engine intake (e.g., intake system 235 described above in FIG. 2) such as the compressor, intake conduit, etc., exceed respective threshold temperatures. Thus, the method 300 at 316 may comprise determining if the compressor outlet temperature will be greater than a threshold temperature during the future horizon. In another example, the intake conduit temperature may be compared to a threshold temperature. In this example, the threshold temperatures of the compressor outlet and/or intake conduit may be determined based on the material of each of the compressor outlet and intake conduit. For example, if the intake conduit is constructed from plastic, the threshold temperature for the intake conduit may represent a temperature below which the plastic tubing of the intake conduit between the compressor outlet and the charge air cooler may not significantly degrade.

If it is determined at 316 that one or more components of the intake system will not exceed threshold temperatures over the future horizon, then the method 300 may continue from 316 to 318 and may not limit engine torque over the future horizon. Thus, the controller may continue to operate the engine boosted to provide the predicted engine torque over the future horizon. Thus, an amount of torque output by the engine may be adjusted according to input from a vehicle operator. Method 300 then ends.

However, if it is determined at 316 that one or more of the components of the intake system will exceed respective threshold temperatures over the future horizon, method 300 may continue from 316 to 320 which comprises adjusting a maximum allowable engine torque over the future horizon to maintain intake components temperatures below respective threshold temperatures via adjustment to one or more engine torque actuators such as an intake throttle, wastegate valve, fuel injectors, etc. Thus, the controller may limit the engine torque over at least a portion of the future torque horizon via adjustments to one or more engine torque actuators, to maintain the temperature of intake components such as the compressor, compressor outlet, intake conduit, etc., below respective threshold temperatures. In addition to limiting the engine torque, a message may be displayed to the operator indicating that torque is being limited.

In one example, the profile of engine torque limited over the future horizon may be determined by equation 1:

$$T_{limited}(k) = \alpha(k) T_{request}(k), \quad (1)$$

where $T_{limited}(k)$ is the torque profile over the future horizon, $\alpha(k)$ is the torque limiting parameter, and $T_{request}(k)$ is the torque requested over the future horizon at each time instance, k, in which the compressor outlet temperature is modelled. If the modelled compressor outlet temperature exceeds the threshold temperature at any time over the future horizon, the requested torque profile $T_{request}(k)$ is limited over the entire horizon by multiplying by a constant $\alpha(k)$ where $0 \leq \alpha(k) \leq 1$.

As such, the limiting of the engine torque may be performed based on each of a difference between the predicted compressor outlet temperature and the threshold temperature, as well as a predicted duration over which the compressor outlet temperature exceeds the threshold temperature. For example, the degree of engine limiting below a demanded torque may be increased as the difference between the predicted compressor outlet temperature and the threshold temperature increases and as the duration over which the compressor outlet temperature exceeds the threshold temperature increases. In one example, it may be determined that the future horizon includes a transient spike in the predicted compressor outlet temperature. Herein, the spike may include the predicted compressor outlet temperature exceeding the threshold temperature by a larger amount for a shorter duration. Due to the shorter duration, it may be determined that even though the compressor outlet temperature spikes by a larger amount, the spike may be followed by compressor outlet cooling. Consequently, engine torque may be limited by a smaller amount. In another example, it may be determined that the future horizon includes a long plateau in the predicted compressor outlet temperature. Therein, the plateau may include the predicted compressor outlet temperature exceeding the threshold temperature by a smaller amount for a longer duration. Due to the longer duration, it may be determined that even though the compressor outlet temperature spikes by a smaller amount, there may be significant compressor outlet heating. Consequently, engine torque may be limited by a larger amount. The controller may determine an amount of heat generated as a function (e.g., product) of the degree of excess temperature and a duration of excess temperature, and limit the torque in accordance. With reference to the previous example, even though the absolute rise in predicted compressor outlet temperature is higher in the case of the spike, due to the longer duration, the net heat generated in the plateau may be higher, which could degrade the material of the intake conduit coupling the compressor outlet to the intercooler, thereby requiring more engine torque limiting.

In some examples, steps 310-320 may be performed iteratively until the predicted compressor outlet temperature is below the threshold temperature. For example, the constant $\alpha(k)$ may be decreased, corresponding to a reduction of the engine torque profile over the entire future horizon. The limited engine torque profile $T_{limited}(k)$ may then be used to iteratively predict compressor outlet temperature, which is then filtered to determine an intake conduit temperature profile. Further torque limiting is then performed until the compressor outlet temperature is at or below the threshold temperature.

The final output of the engine torque profile $T_{limited}(k)$ is implemented and the engine torque over the entire future horizon is limited via the adjustment of one or more engine torque actuators, wherein the adjusting includes maintaining a throttle inlet pressure below a threshold pressure. In one example the engine torque is reduced by decreasing an opening of the intake throttle, thereby limiting the engine intake airflow and the throttle inlet pressure. Engine torque may also be limited by one or more of increasing an opening of an exhaust wastegate valve, increasing an opening of an EGR valve, and retarding spark timing.

In another example, an engine torque output may be limited based on the filtered compressor outlet temperature, or the predicted intake conduit temperature. The engine torque output may be limited below a threshold torque responsive to a duration over which the predicted intake conduit temperature is above a threshold temperature. The engine torque is limited further as the duration increases. The threshold temperature may be determined based on a material property such as the melting temperature of the plastic intake conduit tubing. Engine torque output may be reduced further based on the degree to which a maximum predicted intake conduit temperature exceeds a threshold temperature, and the torque output may be reduced further as the degree increases. The engine torque output may, additionally or optionally, be reduced based on the number of peak predicted intake conduit temperatures that exceed the threshold temperature.

In one example, the engine torque provided is delivered after being run through a geometric moving-average filter to minimize noise, vibration, and harshness (NVH) as shown in equation 2:

$$T_{applied}(k)=\beta \cdot T_{limited}(k)+(1-\beta)\cdot T_{applied}(k-1), \quad (2)$$

where $0 \leq \beta \leq 1$ is the filter parameter chosen based on the relative importance of minimizing NVH and providing robust torque delivery, wherein a larger value of $\beta$ indicates more filtering. In one example, more filtering may be applied when torque is instantaneously limited based on the modeled compressor outlet temperature to a torque much lower than the current level of provided torque. In this way, current and previewed information is utilized to determine a future engine torque profile adjusted to reduce overheating and avoid excessively limiting torque.

More specifically, the maximum allowable engine torque request may be adjusted via a reference governor. For example, in a closed loop control system of engine output torque, the reference signal or input may correspond to the driver demanded torque request as determined via a position of an accelerator pedal. Thus, based on the position of an accelerator pedal (e.g., input device 292 described above in FIG. 2) as determined via a position sensor (e.g., pedal position sensor 294 described above in FIG. 2) a reference signal may be generated and used as input for the closed loop control of engine torque output. Thus, the reference signal generated by the pedal position sensor may correspond to a desired engine torque commanded by the vehicle operator. However, it should be appreciated that in other examples, the reference signal may additionally or alternatively correspond to an intake mass airflow request, fuel injection request, etc.

The reference governor may modify the reference signal to adjust the maximum allowable engine torque. Thus, the reference governor may adjust the reference signal corresponding to the driver demanded torque request, to limit the engine torque output over the future horizon such that constraints, such as the temperature of one or more intake components (e.g., compressor outlet, intake conduit, etc.), are not violated (e.g., do not exceed the respective threshold temperatures).

In particular, the reference governor may predict whether or not constraints such as the intake conduit temperature and/or compressor outlet temperature will be violated (e.g., exceed thresholds) at any point in the future. Further, the reference governor shapes the reference signal (e.g., desired set point) in an optimal manner to avoid violating the constraints while maximizing an amount of torque output by the engine over the future horizon. For example if one or more of a desired airflow, desired engine torque output, desired fuel injection amount, etc., are such that one or more of a compressor speed will exceed a threshold, a compressor outlet temperature will exceed a threshold, an intake conduit temperature will exceed a threshold, etc., over the future horizon, then the reference governor may reduce one or more of the desired engine torque output, desired airflow, and/or desired fuel injection amount, etc., over the future horizon to maintain the compressor speed, compressor outlet temperature and/or intake conduit temperature below the respective thresholds. In the description herein, the threshold compressor speed, threshold compressor outlet temperature, and threshold intake conduit temperature may be referred to as system constraints. Further, a violation of one or more of the constraints may refer to periods of engine operation where one or more of the compressor outlet temperature exceeds the compressor outlet temperature threshold, and/or the intake conduit temperature exceeds the threshold intake conduit temperature, and/or the compressor speed exceeds the threshold compressor speed, for example.

In particular, the reference governor may use predictions of future reference signals (e.g., future driver demanded torque requests) to determine how to modify the future reference signals to maximize the delivered engine torque over the future horizon without violating constraints (e.g., increasing compressor outlet temperature over the threshold). Thus, a map or profile of future modified reference signals may be calculated. Said another way, modifications to be made by the reference governor to the reference signal $(T_{reference}(t))$ over a future horizon may be calculated to maximize the engine torque output over the future horizon without violating the constraints.

In the given examples below, future modifications to the reference signal $T_{reference}(t)$ may be calculated at a current time step where t=1 for a future horizon, the future horizon represented by time steps where t>1. The time step t in the below equations may be a discrete integer value such as 0, 1, 2, 3 . . . n. The time step t may represent a point in time at which the reference signal is received and/or processed and/or modified by the reference governor. Further, the amount of time between time steps, such as for example between t−1 and t may be less than a second. Specifically, the amount of time between sequential time steps may be any time in a range of times between 1 ms and 3 s. In some examples, t=0 may correspond to the most recent previous time step, t=1 may correspond to the current time step, and any times where t>1 may correspond to future time steps. Thus, t=0 may refer to a most recent time step where the reference signal was modified by the reference governor. The modified reference signal at t=0 may be written as $T_{modified}(0)$. Said another way, $T_{modified}(0)$ refers to the most recent previous modified reference signal that was modified by the reference governor.

In a first example, the reference signal $T_{reference}(t)$ over the future horizon may be modified by the reference governor as shown in equation 3:

$$T_{modified}(t)=T_{modified}(t-1)+k(t)\cdot(T_{reference}(t)-T_{modified}(t-1)), \quad (3)$$

where $T_{modified}(t)$ represents the modified reference signal corresponding to, for example, the adjusted maximum allowable engine torque (also referred to herein as the adjusted driver demanded torque request) at any time t over the future horizon and where $0 \le k \le 1$ is chosen such that the system constraints are not violated in the future horizon. Thus, according to the above equation 3, each future modified reference signal may be estimated based on the future modified reference signal immediately preceding the future modified reference signal being estimated. In this way, the above method for calculating the future modified reference signals may be recursive in nature.

In some examples, the value of k may be constant. However, in other examples, k may be unique for each time step. In yet further examples, some values of k may be the same, while other may be different for different time steps in the future. Thus, in some examples, the reference governor may calculate a new value for k at each time step in the future in which $T_{modified}$ is calculated. The values of k over the future horizon may be calculated to maximize an amount of engine torque delivered without violating the constraints. Thus, the reference governor may use future estimates of the reference signal to modify the reference signal over the future horizon to maximize an amount of engine torque delivered without violating the constraints.

However, in another example, the reference signal $T_{reference}(t)$ may be modified by the reference governor over the future horizon according to equation 4:

$$T_{modified}(t)=k(t)\cdot T_{reference}(t), \quad (4)$$

where $T_{modified}(t)$ represents the modified reference signal corresponding to, for example, the adjusted maximum allowable engine torque (also referred to herein as the adjusted driver demanded torque request) at any time t over the future horizon, and where $0 \le k \le 1$ is chosen such that the system constraints are not violated in the future horizon.

In some examples, the value of k may be constant. However, in other examples, k may be unique for each time point. In yet further examples, some values of k may be the same, while other may be different for different time points in the future. Thus, in some examples, the reference governor may calculate a new value for k at each time point in the future in which $T_{modified}$ is calculated. The values of k over the future horizon may be calculated to maximize an amount of engine torque delivered without violating the constraints. Thus, the reference governor may use future estimates of the reference signal to modify the reference signal over the future horizon to maximize an amount of engine torque delivered without violating the constraints.

In yet another example, the reference signal $T_{reference}(t)$ may be modified by the reference governor over the future horizon according to equation 5:

$$T_{modified}(t)=T_{modified}(0)+k\cdot(T_{reference}(t)-T_{modified}(0)), \quad (5)$$

where $T_{modified}(t)$ represents the modified reference signal corresponding to, for example, the adjusted maximum allowable engine torque (also referred to herein as the adjusted driver demanded torque request) at any time t over the future horizon, and where $0 \le k \le 1$ is chosen such that the system constraints are not violated in the future horizon. As described above, $T_{modified}(0)$ refers a most modified reference signal that has already been modified by the reference governor, and thus refers to a previous time step before the current time step at which the future modified reference signals are being calculated.

As shown in equation 5, the value of k may be constant. The value of k over the future horizon may be calculated to maximize an amount of engine torque delivered without violating the constraints. Thus, the reference governor may use future estimates of the reference signal to modify the reference signal over the future horizon to maximize an amount of engine torque delivered without violating the constraints. However, in other examples, k may be unique for each time point. In yet further examples, some values of k may be the same, while other may be different for different time points in the future. Thus, in some examples, the reference governor may calculate a new value for k at each time point in the future in which $T_{modified}$ is calculated.

After adjusting the maximum allowable torque over the future horizon at 320, method 300 may then continue from 320 to 322 which comprises adjusting the second estimate of future engine operating conditions and generating a third estimate of future engine operating conditions based on the adjust maximum allowable engine torque. Thus, based on the system constraints such as intake conduit and/or compressor outlet temperatures over the future horizon, engine operating conditions such as fuel consumption, compressor outlet temperature, etc., may be adjusted to compensate for the adjusted future engine output torque profile that is generated to prevent constraint violation. Thus, based on how the future engine output torque may be limited over the future horizon to maintain one or more of the compressor outlet temperature, intake conduit temperature, and compressor speed below respective thresholds, estimates of future engine operating conditions may be adjusted to compensate for the adjusted engine torque profile over the future horizon. For example, engine torque over the future horizon may be limited (e.g., reduced) to maintain the compressor outlet temperature below a threshold, and in response to this reduced engine torque output over the future horizon, estimates of fuel consumption over the future horizon may be reduced. Thus, the method 300 at 320 may in some examples comprise adjusting the predicted fuel consumption profile at 324. Thus, the method 300 comprises utilizing the predicted system constraints over the future horizon to adjust future fuel consumptions profiles to compensate for changes in fuel consumption resulting from adjustments to the maximum allowable engine over the future horizon made to prevent constraint violation (e.g., to maintain the intake components below respective threshold temperatures). In some examples, method 300 may then end after adjusting estimates of future engine operating conditions.

However, in some examples, method 300 may continue from 322 to 326 which comprises selecting a route with the lowest future fuel consumption profile. Thus, as described above, future fuel consumption profiles may be generated for a plurality of future vehicle routes at 324, where the fuel consumption profiles may consider the effects of torque limiting due to system constraints on fuel consumption. Based on the future fuel consumption profiles that account for torque limiting due to system constraints, the controller may select the route with the lowest future fuel consumption profile. In this way, an accuracy of estimates of future fuel consumption may be increased by accounting for how engine output torque and therefore fuel consumption may be limited due to system constraints such as compressor outlet temperature. Further, by improving the accuracy of estimates of future fuel consumption along one or more routes, future fuel consumption may be reduced by selecting the route with the lowest future fuel consumption profile. Method 300 then ends.

FIG. 4 illustrates an example method 400 for mapping compressor outlet temperature from engine torque and engine speed. This mapping may be used to determine a compressor outlet temperature profile based on current and predicted engine torque requirements. A single mapping may be used over the entire profile time horizon by assuming that certain conditions such as barometric pressure, air temperature, exhaust gas temperature, and cam positions change slowly and/or are fixed over a short time horizon. However, in other examples, the mapping may be constructed based on future ambient conditions as obtained from, for example, one or more remote servers (e.g., network cloud 160 described above in FIG. 1), and thus may account for changes in the ambient conditions. Said another way, based on weather data received from the one or more remote servers, future ambient conditions at a predicted future vehicle location and time may be estimated. The predicted future vehicle location at a future time may be estimated based on one or more of a current vehicle position, vehicle route, vehicle speed, road information, etc. The modeled compressor outlet temperature profile is determined over a time horizon. In one example, FIG. 4 may be performed as part of the routine of FIG. 3, such as at 312.

At 402, the routine includes determining the engine load based on the predicted engine torque determined over the future horizon based on current and predicted engine operating conditions. In one example, the predicted engine torque may be determined based on one or more of driver demanded torque requests, road-grade information, vehicle weight, ambient conditions, auxiliary loads, etc., as discussed at 304 of FIG. 3. The engine controller may then map the predicted torque to the engine load using a pre-defined mapping, or based on a look-up table stored in the controller's memory. The mappings contained in the controller's memory may be specific to that engine family and are determined based on measurements taken during an initial engine calibration process. At 404, the engine load is converted to an engine air mass-flow rate using engine speed and pre-defined engine-specific parameters such as the cylinder standard air charge and number of cylinders of the engine. At 406, an exhaust back-pressure is determined based on barometric pressure and engine air mass-flow rate. In one example, the barometric pressure may be measured by on-board vehicle sensors or external vehicle communication methods, such as vehicle-to-vehicle communication and/or one or more remote servers (e.g., cloud network 160 described above in FIG. 1). At 408, manifold air pressure (MAP) is determined using the exhaust back-pressure and a series of pre-defined ECU mappings. At 410, the throttle inlet pressure is determined from the MAP assuming a nominal pressure drop across the throttle plate. At 412, the compressor pressure ratio is determined using the engine air mass-flow rate, barometric pressure, and the throttle inlet pressure. At 414, the compressor efficiency is calculated using the air mass-flow rate, compressor pressure ratio, and the inlet air temperature. In one example, the inlet air temperature may be measured by an IAT sensor. As discussed previously, the IAT may also be estimated using external vehicle communications. In one example, vehicle-to-vehicle communication is used to determine a comparable inlet air temperature. At 416, the instantaneous compressor outlet temperature is determined using the compressor efficiency, inlet air temperature, and the compressor pressure ratio. An example mapping is shown with reference to FIG. 5. In this example mapping, the instantaneous compressor outlet temperature is shown to increase as engine torque increases. In other examples, engine speed may be a more significant contributing factor to the compressor outlet temperature as a function of engine torque. The modeled instantaneous compressor outlet temperature may then be used to predict the intake conduit temperature and adjust a degree of limiting of an engine torque.

Figure 5:
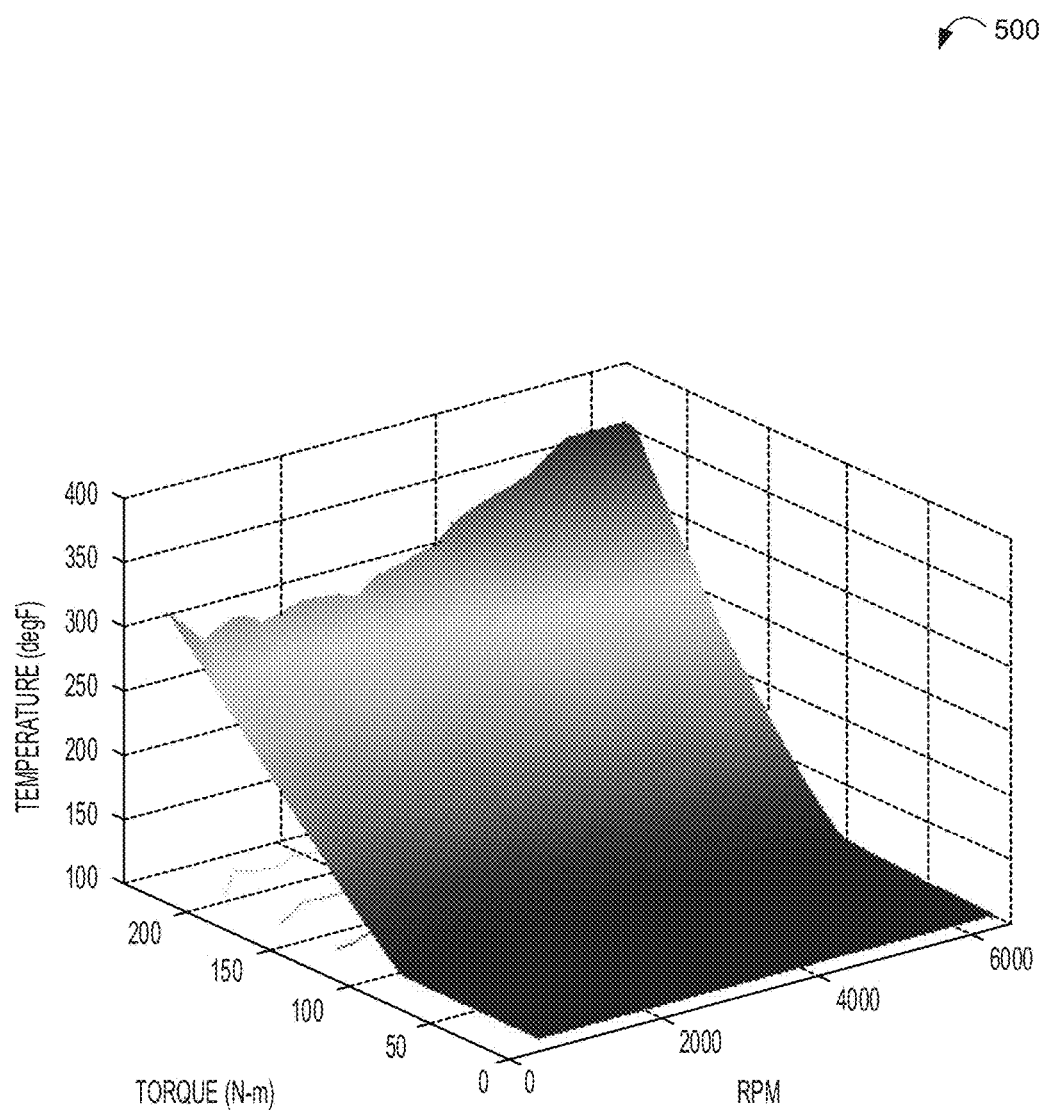
FIG. 5 shows a map relating engine torque and engine speed to instantaneous compressor outlet temperature.

FIG. 5 shows an example mapping of compressor outlet temperature from engine torque and engine speed. In one example, as shown at map 500, the information used to model the compressor outlet temperature profile, such as barometric pressure, intake air temperature, exhaust gas temperature, and cam positions, are assumed to change slowly and/or are fixed over a short time horizon. With current measurements of these engine conditions, an approximate mapping of engine torque and engine speed to compressor outlet temperature can be generated, as in FIG. 5. With information about the engine torque and engine speed over a time horizon, a compressor outlet temperature profile can be generated over the time horizon.

Figure 6A:
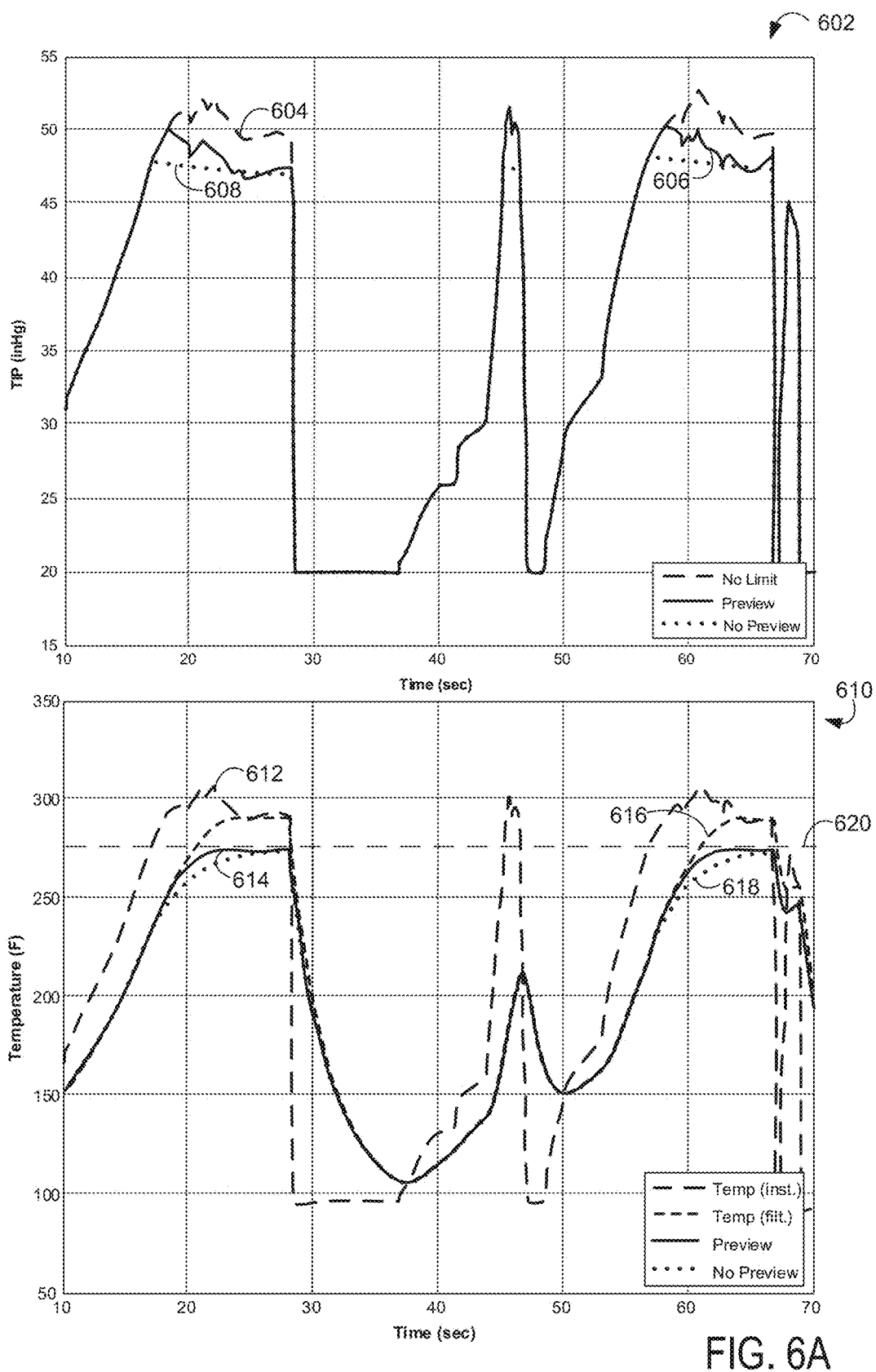
FIG. 6A shows an example plot of changes to a turbine inlet pressure over time responsive to a predicted compressor outlet temperature.
Figure 6B:
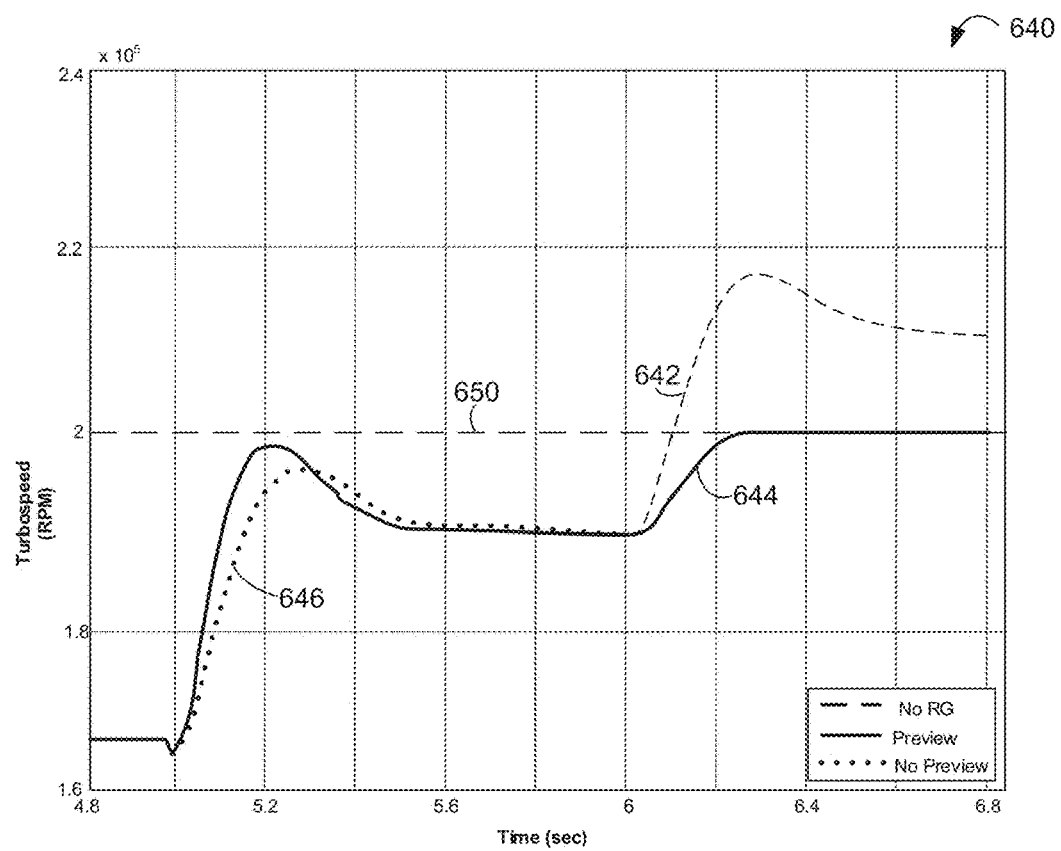
FIG. 6B shows an example plot of changes to a compressor speed over time responsive to a predicted compressor speed.
Figure 7:
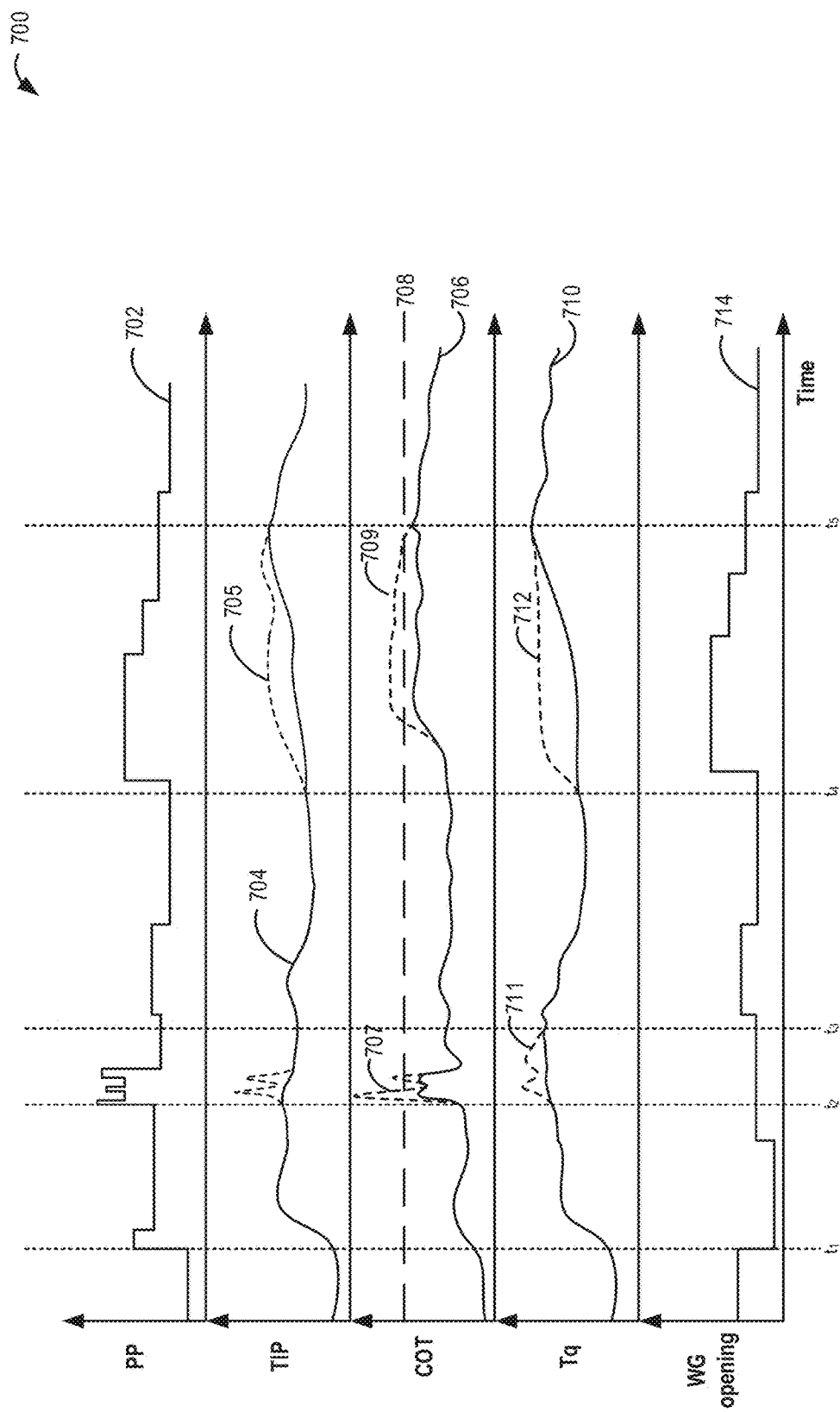
FIG. 7 shows an example plot of compressor outlet temperature control via engine torque adjustments.

FIGS. 6A and 6B show graphs that compare how compressor outlet temperatures and compressor speeds may be managed in strategies that use previewed future engine operating conditions versus those that don't use the previewed future engine operating conditions.

Focusing on FIG. 6A, it shows an example regulation of compressor outlet temperature via torque adjustments that are based on current and predicted engine operating conditions. In map 602, the variation in throttle inlet pressure (TIP) over time for an example operating sequence is shown. The x-axis shows time (in seconds) and the y-axis shows TIP (in inches of Hg). The throttle inlet pressure (TIP) relates to engine torque. In the depicted example, the preview time horizon is set to 3.0 seconds. The engine torque is actuated based on the modeled compressor outlet temperature to reduce overheating without excessively reducing engine torque. An example comparison of changes to the throttle inlet pressure (TIP), compressor outlet temperature, and intake conduit temperature when controlled using only current engine operating conditions relative to being controlled using previewed information in addition to current engine operating conditions is shown. Further, corresponding changes to the parameters in the absence of any temperature controlling action is shown.

Plot 604 (dashed line) of map 602 shows changes in the TIP over time if the compressor outlet temperature is not limited to reduce overheating (method 1: no limit). In method 1, the TIP is at a maximum, providing all requested engine torque. Plot 606 (solid line) of map 602 shows the TIP over time if compressor outlet temperature is regulated to prevent overheating using previewed information to predict engine torque requirements and compressor outlet temperature over a time horizon (method 2: preview), as discussed in the method of FIGS. 3-4. Plot 608 (dotted line) of map 602 shows the TIP over time if compressor outlet temperature is regulated to reduce overheating without the use of previewed information (method 3: no preview), as performed conventionally in the prior art. As can be seen by comparing the plots, by using previewed information, more engine torque can be provided to the operator while limiting overheating, especially during transient engine torque requests, such as at the narrow peak near the 45 second mark. During this transient engine torque request, the TIP while using previewed information (plot 606) and the TIP without limiting torque (plot 604) are equally high, both exceeding the TIP of plot 608, the method using only current information. As a result of utilizing previewed information (plot 606) to regulate engine torque, the provided engine torque was not limited during this transient engine torque request illustrated in the example operating sequence. The method of adjusting compressor outlet temperature using previewed information may result in an increase in the amount of engine torque provided, allowing a driver demand to be better met while concurrently regulating compressor outlet temperatures. In the example operating sequence shown in map 602, the average TIP using previewed information, as in plot 606, is larger than the average TIP using only current information, as in plot 608. In this example operating sequence, the use of previewed information increases the amount of engine torque provided over the method using only current information.

Focusing on FIG. 6B, it shows example regulation of compressor speed via wastegate valve adjustment that may be based on current and predicted engine operating conditions. More specifically, an example comparison of changes to the intake compressor speed of a turbocharger, when controlled using only current engine operating conditions relative to being controlled using previewed information in addition to current engine operating conditions is shown. Further, corresponding changes to the compressor speed in the absence of any speed controlling action is shown. In map 640, the turbospeed in revolutions per minute (RPM) over time for an example operating sequence is shown. The x-axis shows time (in seconds) and the y-axis shows turbospeed (in RPM). The turbospeed relates and/or is directly proportional to engine torque.

Speed threshold 650 represents the upper limit of permissible compressor speed, which in one example may be set to $2.0 \times 10^5$ RPM. Plot 642 (long dashed line) of map 640 shows the instantaneous compressor speed if the compressor speed is not limited. Plot 646 (short dashed line) of map 640 shows the compressor speed if the compressor speed is determined using only current information and not previewed future vehicle operating information. Plot 644 represents the compressor speed if the compressor speed is estimated using current and previewed information.

Plots 644 (solid line) and 646 (dotted line) of map 640 show the compressor speed if the compressor speed is limited to keep the compressor speed below a set speed threshold, such as the example speed threshold 650. As such, plots 644 and 646 remain below speed threshold 650 over the entire time horizon. Plot 644 illustrates that the use of previewed information allows the compressor to more quickly approach the speed threshold without overheating relative to the approach where future previewed vehicle information is not used (plot 646). The ability to more aggressively increase compressor speed may result in an improved ability to provide engine torque, as indicated in map 640.

In this way, by using current and predicted vehicle operating conditions, compressor speed may be more accurately estimated over a future horizon and therefore more precisely regulated without unnecessarily restricting engine torque output or incurring compressor surge. As a result, component degradation is reduced, and component life is extended.

FIG. 7 shows an example operating sequence 700 illustrating compressor outlet temperature regulation using current and/or previewed information. The horizontal (x-axis) denotes time and the vertical markers $t_1$-$t_5$ identify significant times for engine torque regulation. Changes to an operator pedal position (PP) are shown at plot 702, changes to a throttle inlet pressure (TIP) are shown at plot 704, changes to a compressor outlet temperature (COT) are shown at plot 706, and changes to an engine torque are shown at plot 710. In the present example, changes to engine torque are achieved via adjustments to an exhaust wastegate valve opening (WG, plot 714) although it will be appreciated that torque may also be limited via corresponding adjustments to an intake throttle opening.

Prior to $t_1$, the engine may be operating without boost. The engine may be providing a smaller torque output responsive to the smaller driver demand. The wastegate may be partially open to improve boost response if a rise in driver demand occurs.

At $t_1$, there may be an increase in driver demand, such as due to a tip-in event as indicated by the change in pedal position. In response to the increase in driver demand, the wastegate opening may be reduced (e.g., the wastegate may be fully closed) to accelerate an exhaust turbine, thereby increasing the acceleration of an intake compressor and increasing the throttle inlet pressure. In addition, the opening of an intake throttle may be increased. During the mentioned engine operations, despite changes in driver demand, the COT may remain within threshold 708, and therefore no engine torque limiting adjustments are made.

At $t_2$, based on current and future vehicle operating conditions, a spike in torque demand and a corresponding spike in COT may be predicted. For example, based on navigational input, and driver history, it may be determined that the driver is entering a road segment where there is some traffic and where the driver tends to drive aggressively. The controller may predict that the COT profile in the future horizon includes predicted COT peak 707 (dashed segment) where the COT transiently exceeds threshold 708 by a larger amount. In particular, the controller may determine based on a predicted PP profile that the predicted COT will sharply rise above the threshold but then fall below the threshold soon after. In view of the predicted COT peak 707, at $t_2$, the controller may limit the engine torque to preempt the rise in COT. In particular, torque may be limited by a first smaller amount below demanded torque 711 (see dashed segment 711 as compared to corresponding solid line 710). In one example, the torque may be limited by increasing the opening of the wastegate (by a smaller amount) to reduce turbine speed and boost pressure despite the increase in driver demand. As such, torque may be limited for a shorter duration from $t_2$ to $t_3$, after which engine torque may be provided corresponding to the driver demand. In response to torque limiting controls, TIP decreases below a desired TIP 705 (see dashed segment 705 as compared to corresponding solid line 704), that may be produced if torque were not limited.

At $t_4$, based on current and future vehicle operating conditions, a plateau in torque demand and a corresponding plateau in COT may be predicted. For example, based on navigational input, and driver history, it may be determined that the driver is entering an incline. The controller may predict that the COT profile in the future horizon includes predicted COT plateau 709 (dashed segment) where the COT exceeds threshold 708 by a smaller amount. In particular, the controller may determine based on a predicted PP profile that the predicted COT will rise above the threshold and stay above the threshold for an extended duration. In view of the predicted COT plateau 709, at $t_4$, the controller may limit the engine torque to preempt the rise in COT. In particular, torque may be limited by a second larger amount below demanded torque 712 (see dashed segment 712 as compared to corresponding solid line 710). In one example, the torque may be limited by increasing the opening of the wastegate (by a larger amount) to reduce turbine speed and boost pressure despite the increase in driver demand. As such, torque may be limited for a longer duration from $t_4$ to $t_5$, after which engine torque may be provided corresponding to the driver demand. In response to torque limiting controls, TIP decreases below a desired TIP 705 (see dashed segment 705 as compared to corresponding solid line 704), that may be produced if torque were not limited. In this way, previewed information obtained from external communication is utilized in addition to current information in order to model compressor outlet temperature over a future time horizon. It is therefore possible to more precisely regulate compressor outlet temperature without unnecessarily restricting engine torque output. In addition, hardware positioned downstream of the compressor outlet may be better protected from overheating.

In one example, a method for an engine coupled to a vehicle, comprises adjusting an engine torque output based on a future compressor outlet temperature profile to maintain an actual compressor outlet temperature below a threshold, the future compressor outlet temperature profile based on current and predicted engine operating conditions estimated based on inputs from external vehicle communications. In the preceding example, additionally or optionally, the future compressor outlet temperature profile includes a predicted compressor outlet temperature over each point of a future horizon of vehicle operation. In any or all of the preceding examples, additionally or optionally, the predicted compressor outlet temperature is based on a predicted engine torque required over the future horizon of vehicle operation. In any or all of the preceding examples, additionally or optionally, the adjusting includes limiting the engine torque output below a threshold torque responsive to a duration over which the predicted compressor outlet temperature is above a threshold temperature, a torque level to which the engine torque is limited being reduced as the duration increases. In any or all of the preceding examples, additionally or optionally, the threshold temperature is based on a material property of a tubing coupling an intake compressor outlet to a downstream intercooler. In any or all of the preceding examples, additionally or optionally, the torque level to which the engine torque output is limited is further reduced responsive to a degree beyond which a peak predicted temperature of the future compressor outlet temperature profile is above the threshold temperature, the torque level reduced further as the degree increases. In any or all of the preceding examples, additionally or optionally, limiting the engine torque includes reducing an opening of an intake throttle to reduce an intake air flow to the engine. In any or all of the preceding examples, additionally or optionally, limiting the engine torque further includes one or more of increasing an opening of an exhaust wastegate valve, increasing an opening of an EGR valve, and retarding spark timing. In any or all of the preceding examples, additionally or optionally, the inputs from external vehicle communications include inputs from one or more of a navigation system and a wireless communication unit communicatively coupled to the engine, wherein the inputs include one or more of vehicle data, navigation data, location data, map data, terrain data, and weather data, and wherein the current and predicted engine operating conditions include each of a vehicle weight, an engine size, a vehicle speed, an engine torque, an engine load, barometric pressure, exhaust pressure, MAP, inlet air temperature, a compressor pressure ratio, compressor efficiency, throttle inlet pressure, and an intake mass airflow rate. In any or all of the preceding examples, additionally or optionally, the engine is a turbocharged engine system and the actual compressor outlet temperature includes a temperature of boosted intake gasses included between a turbocharger compressor and an intercooler. In any or all of the preceding examples, additionally or optionally, further comprises estimating the future compressor outlet temperature profile based on the current and predicted engine operating conditions, the estimating including estimating an initial future compressor outlet temperature based on current and predicted engine operating conditions, and filtering the initial compressor outlet temperature over the future horizon via one or more of a low-pass filter and a moving average filter, a bandpass of the filter based on a material property of tubing between the turbocharger compressor and the intercooler, and a duration of the future horizon. In any or all of the preceding examples, additionally or optionally, estimating the future compressor outlet temperature profile includes: estimating an engine torque over the future horizon based on current and predicted engine operating conditions, estimating an engine air mass-flow rate over the future horizon based on the estimated torque, estimating an exhaust back-pressure based on each of the estimated engine air mass-flow rate and barometric pressure, mapping each of an intake manifold pressure and a throttle inlet pressure based on the exhaust back-pressure, estimating a compressor pressure ratio based on each of the estimated engine air mass-flow rate, the throttle inlet pressure, and the exhaust back-pressure; estimating a compressor efficiency based on each of the estimated engine air mass-flow rate, the compressor pressure ratio, and an inlet air temperature, and estimating the initial future compressor outlet temperature based on each of the estimated compressor efficiency, the inlet air temperature, and the compressor pressure ratio.

In another example, an engine method comprises estimating a compressor outlet temperature profile for a future horizon of vehicle operation based on current and predicted engine operating conditions, the compressor outlet temperature profile including a predicted compressor outlet temperature at each point of the future horizon and adjusting an engine torque output responsive to each of a degree and duration over which the predicted compressor outlet temperature of the compressor outlet temperature profile exceeds a threshold temperature. In the preceding example, additionally or optionally, the adjusting includes limiting the engine torque output below a driver demand based torque as the degree at which a peak predicted compressor outlet temperature exceeds a threshold temperature increases and as the duration over which the predicted compressor outlet temperature exceeds the threshold temperature increases. In any or all of the preceding examples, additionally or optionally, the current and predicted engine operating conditions are based on inputs from external vehicle communications, the external vehicle communications including one or more of a navigation system and a wireless communication unit communicatively coupled to the engine, and the inputs include one or more of vehicle data, navigation data, location data, map data, terrain data, and weather data, and wherein the current and predicted engine operating conditions include each of a vehicle weight, an engine size, a vehicle speed, an engine torque, an engine load, barometric pressure, exhaust pressure, manifold pressure (MAP), inlet air temperature, a compressor pressure ratio, compressor efficiency, throttle inlet pressure, and an intake mass airflow rate. In any or all of the preceding examples, additionally or optionally, the engine is a boosted engine including an intake compressor, and wherein the adjusting includes adjusting to maintain each of a compressor outlet temperature below the threshold temperature, and a throttle inlet pressure below a threshold pressure. In any or all of the preceding examples, additionally or optionally, the estimating includes estimating an engine torque profile for the future horizon of based on the current and predicted engine operating conditions, and estimating the compressor outlet temperature profile based on a filtered value of the estimated engine torque profile.

In yet another example, a vehicle system comprises an engine including an intake manifold, an intake throttle coupled to the intake manifold, an intake compressor coupled upstream of the intake throttle for providing a boosted aircharge to the intake manifold, an intercooler coupled downstream of the intake compressor via a tubing, a navigation system communicatively coupled to a network, the navigation system configured to retrieve one or more inputs including vehicle data, navigation data, location data, map data, terrain data, and weather data from the network, and a controller with computer readable instructions stored on non-transitory memory for: estimating actual and predicted engine operating conditions for an upcoming segment of vehicle travel based on the one or more inputs retrieved at the navigation system, calculating a compressor outlet temperature profile for the upcoming segment of vehicle travel based on the estimated actual and predicted engine operating conditions, and maintaining an actual compressor outlet temperature below a threshold temperature via adjustments to the intake throttle, the adjustments responsive to the calculated compressor outlet temperature profile. In any or all of the preceding examples, additionally or optionally, the maintaining includes reducing an engine torque below a threshold torque by reducing an opening of the intake throttle responsive to a predicted temperature of the calculated compressor outlet temperature profile exceeding a threshold temperature, the threshold torque based at least on a driver torque demand, the threshold temperature based at least on a material property of the tubing. In any or all of the preceding examples, additionally or optionally, the calculating includes: estimating an engine torque for the upcoming segment of vehicle travel based on the estimated actual and predicted engine operating conditions, converting the estimated engine torque into an estimated engine air mass-flow rate, estimating an exhaust back-pressure based on each of the estimated engine air mass-flow rate and barometric pressure, mapping each of an intake manifold pressure and a throttle inlet pressure based on the exhaust back-pressure, estimating a compressor pressure ratio based on each of the estimated engine air mass-flow rate, the throttle inlet pressure, and the exhaust back-pressure, estimating a compressor efficiency based on each of the estimated engine air mass-flow rate, the compressor pressure ratio, and an inlet air temperature, and predicting the compressor outlet temperature profile based on each of the estimated compressor efficiency, the inlet air temperature, and the compressor pressure ratio.

The invention claimed is:

1. An engine method, comprising:
estimating a compressor speed profile for a future horizon of vehicle operation based on current and predicted engine operating conditions, the compressor speed profile including a predicted compressor speed at each point of different time points of the future horizon; and
adjusting an engine torque output responsive to each of a degree and a duration over which the predicted compressor speed, at a point of the different time points of the compressor speed profile, exceeds a threshold speed.

2. The engine method of claim 1, wherein the adjusting includes limiting the engine torque output below a driver demand based torque as the degree at which a peak predicted compressor speed at the point of the different points of the compressor speed profile exceeds the threshold speed increases and as the duration over which the predicted compressor speed at the point of the different points of the compressor speed profile exceeds the threshold speed increases.

3. The engine method of claim 2, wherein the estimating includes estimating an engine torque profile for the future horizon based on the current and predicted engine operating conditions, and estimating the compressor speed profile based on a filtered value of an estimated engine torque profile.

4. The engine method of claim 2, wherein a compressor is coupled to a turbine, and wherein limiting the engine torque output includes increasing an opening of a wastegate coupled to the turbine to lower compressor speed and decrease boost pressure.

5. The engine method of claim 2, wherein limiting the engine torque output includes reducing an opening of an intake throttle to reduce an intake air flow to the engine.

6. The engine method of claim 2, wherein limiting the engine torque output further includes one or more of increasing an opening of an EGR valve, and retarding spark timing.

7. The engine method of claim 1, wherein the current and predicted engine operating conditions are based on inputs from external vehicle communications, the external vehicle communications including one or more of a navigation system and a wireless communication unit communicatively coupled to an engine, wherein the inputs include one or more of vehicle data, navigation data, location data, map data, terrain data, and weather data, and wherein the current and predicted engine operating conditions include each of a vehicle weight, an engine size, a vehicle speed, an engine torque, an engine load, barometric pressure, exhaust pressure, manifold pressure (MAP), inlet air temperature, a compressor pressure ratio, compressor efficiency, throttle inlet pressure, and an intake mass airflow rate.

8. The engine method of claim 7, wherein the engine is a boosted engine including an intake compressor, and wherein the adjusting the engine torque output includes adjusting the engine torque output to maintain each of a compressor speed below the threshold speed, and the throttle inlet pressure below a threshold pressure.

* * * * *